US009808738B2

(12) United States Patent
Duesel, Jr. et al.

(10) Patent No.: US 9,808,738 B2
(45) Date of Patent: Nov. 7, 2017

(54) COMPACT WASTEWATER CONCENTRATOR USING WASTE HEAT

(71) Applicant: HEARTLAND TECHNOLOGY PARTNERS LLC, St Louis, MO (US)

(72) Inventors: Bernard F. Duesel, Jr., Goshen, NY (US); Michael J. Rutsch, Pittsburgh, PA (US); Craig Clerkin, Stoughton, WI (US)

(73) Assignee: HEARTLAND WATER TECHNOLOGY, INC., St Louis, MO (US)

( * ) Notice: Subject to any disclaimer, the term of this patent is extended or adjusted under 35 U.S.C. 154(b) by 540 days.

(21) Appl. No.: 14/059,795

(22) Filed: Oct. 22, 2013

(65) Prior Publication Data
US 2014/0041811 A1    Feb. 13, 2014

Related U.S. Application Data

(63) Continuation of application No. 12/705,462, filed on Feb. 12, 2010, now Pat. No. 8,568,557, which is a (Continued)

(51) Int. Cl.
B01D 1/14 (2006.01)
B01D 1/30 (2006.01)
(Continued)

(52) U.S. Cl.
CPC ............ B01D 1/14 (2013.01); B01D 1/305 (2013.01); C02F 1/048 (2013.01); C02F 1/10 (2013.01);
(Continued)

(58) Field of Classification Search
USPC ............................. 159/24.2; 203/27; 431/202
See application file for complete search history.

(56) References Cited

U.S. PATENT DOCUMENTS 2,372,846 A    4/1945  Frederick et al.
2,387,818 A   10/1945  Wethly
(Continued)

FOREIGN PATENT DOCUMENTS

CL    757-2004    5/2007
CN    1262236     8/2000
(Continued)

OTHER PUBLICATIONS

Japanese Office Action for Patent Application No. 2012-552886, mailed Jan. 7, 2015.
(Continued)

Primary Examiner — Nina Bhat
(74) Attorney, Agent, or Firm — Marshall, Gerstein & Borun LLP

(57) ABSTRACT

A compact and portable liquid concentrator includes a gas inlet, a gas exit and a flow corridor connecting the gas inlet and the gas exit, wherein the flow corridor includes a narrowed portion that accelerates the gas through the flow corridor. A liquid inlet injects liquid into the gas stream at a point prior to the narrowed portion so that the gas-liquid mixture is thoroughly mixed within the flow corridor, causing a portion of the liquid to be evaporated. A demister or fluid scrubber downstream of the narrowed portion removes entrained liquid droplets from the gas stream and re-circulates the removed liquid to the liquid inlet through a re-circulating circuit. Fresh liquid to be concentrated is also introduced into the re-circulating circuit at a rate sufficient to offset the amount of liquid evaporated in the flow corridor.

20 Claims, 16 Drawing Sheets

Related U.S. Application Data continuation-in-part of application No. 12/530,484, filed as application No. PCT/US2008/056702 on Mar. 12, 2008, now abandoned.

(60) Provisional application No. 60/906,743, filed on Mar. 13, 2007, provisional application No. 61/229,650, filed on Jul. 29, 2009, provisional application No. 61/152,248, filed on Feb. 12, 2009.

(51) Int. Cl.
| | | |
|---|---|---|
| *C02F 1/04* | (2006.01) | |
| *C02F 1/10* | (2006.01) | |
| *F23G 7/08* | (2006.01) | |
| *C02F 1/12* | (2006.01) | |
| *C02F 1/16* | (2006.01) | |
| *C02F 1/20* | (2006.01) | |

(52) U.S. Cl.
CPC ............... *F23G 7/085* (2013.01); *C02F 1/12* (2013.01); *C02F 1/16* (2013.01); *C02F 1/20* (2013.01); *C02F 2201/008* (2013.01); *C02F 2209/03* (2013.01); *Y02E 20/12* (2013.01)

(56) References Cited

U.S. PATENT DOCUMENTS

| | | |
|---|---|---|
| 2,468,455 A | 4/1949 | Metziger |
| 2,560,226 A | 7/1951 | Joos et al. |
| 2,619,421 A | 11/1952 | Greenfield |
| 2,651,647 A | 9/1953 | Greenfield |
| 2,658,349 A | 11/1953 | Keller |
| 2,658,735 A | 11/1953 | Ybarrondo |
| 2,721,065 A | 10/1955 | Ingram |
| 2,790,506 A | 4/1957 | Vactor |
| 2,867,972 A | 1/1959 | Hokderreed et al. |
| 2,879,838 A | 3/1959 | Flynt et al. |
| 2,890,166 A | 6/1959 | Heinze |
| 2,911,421 A | 11/1959 | Greenfield |
| 2,911,423 A | 11/1959 | Greenfield |
| 2,979,408 A | 4/1961 | Greenfield |
| 2,981,250 A | 4/1961 | Steward |
| 3,060,921 A | 10/1962 | Luring et al. |
| 3,076,715 A | 2/1963 | Greenfield |
| 3,203,875 A | 8/1965 | Harris |
| 3,211,538 A | 10/1965 | Gross et al. |
| 3,212,235 A | 10/1965 | Markant |
| 3,251,398 A | 5/1966 | Greenfield |
| 3,268,443 A | 8/1966 | Cann |
| 3,284,064 A | 11/1966 | Kolm et al. |
| 3,299,651 A | 1/1967 | McGrath |
| 3,304,991 A | 2/1967 | Greenfield |
| 3,306,039 A | 2/1967 | Peterson |
| 3,323,575 A | 6/1967 | Greenfield |
| 3,405,918 A | 10/1968 | Calaceto et al. |
| 3,432,399 A | 3/1969 | Schutt |
| 3,488,686 A | 1/1970 | Dunwoody et al. |
| 3,539,549 A | 11/1970 | Greenfield |
| 3,578,892 A | 5/1971 | Wilkinson |
| 3,601,374 A | 8/1971 | Wheeler |
| 3,638,924 A | 2/1972 | Calaceto et al. |
| 3,704,570 A | 12/1972 | Gardenier |
| 3,713,786 A | 1/1973 | Umstead |
| 3,716,458 A | 2/1973 | Greenfield et al. |
| 3,730,673 A | 5/1973 | Straitz, III |
| 3,743,483 A | 7/1973 | Shah |
| 3,754,869 A | 8/1973 | Van Raden |
| 3,756,580 A | 9/1973 | Dunn |
| 3,756,893 A | 9/1973 | Smith |
| 3,762,893 A | 10/1973 | Larsen |
| 3,782,300 A | 1/1974 | White et al. |
| 3,789,902 A | 2/1974 | Shah et al. |
| 3,826,096 A | 7/1974 | Hrusch |
| 3,838,974 A | 10/1974 | Hemsath et al. |
| 3,838,975 A | 10/1974 | Tabak |
| 3,840,002 A | 10/1974 | Douglas et al. |
| 3,855,079 A | 12/1974 | Greenfield et al. |
| 3,870,585 A | 3/1975 | Kearns et al. |
| 3,876,490 A | 4/1975 | Tsuruta |
| 3,880,756 A | 4/1975 | Raineri et al. |
| 3,898,134 A | 8/1975 | Greenfield et al. |
| 3,901,643 A | 8/1975 | Reed et al. |
| 3,915,620 A | 10/1975 | Reed |
| 3,917,508 A | 11/1975 | Greenfield et al. |
| 3,925,148 A | 12/1975 | Erwin |
| 3,944,215 A | 3/1976 | Beck |
| 3,945,331 A | 3/1976 | Drake et al. |
| 3,947,215 A | 3/1976 | Peterson et al. |
| 3,947,327 A | 3/1976 | Greenfield et al. |
| 3,950,230 A | 4/1976 | Greenfield et al. |
| 3,994,671 A | 11/1976 | Straitz, III |
| 4,001,077 A | 1/1977 | Kemper |
| 4,007,094 A | 2/1977 | Greenfield et al. |
| 4,012,191 A | 3/1977 | Lisankie et al. |
| 4,013,516 A | 3/1977 | Greenfield et al. |
| 4,026,682 A | 5/1977 | Pausch |
| 4,036,576 A * | 7/1977 | McCracken ............... F23G 5/46 110/212 |
| 4,070,423 A | 1/1978 | Pierce |
| 4,079,585 A | 3/1978 | Helleur |
| 4,080,883 A | 3/1978 | Zink et al. |
| 4,092,908 A | 6/1978 | Straitz, III |
| 4,118,173 A | 10/1978 | Shakiba |
| 4,119,538 A | 10/1978 | Yamauchi et al. |
| 4,140,471 A | 2/1979 | Straitz, III et al. |
| 4,154,570 A | 5/1979 | Schwartz |
| 4,157,239 A | 6/1979 | Reed |
| 4,181,173 A | 1/1980 | Pringle |
| 4,185,685 A | 1/1980 | Giberson |
| 4,198,198 A | 4/1980 | Straitz, III |
| 4,227,897 A | 10/1980 | Reed |
| 4,230,536 A | 10/1980 | Sech |
| 4,257,746 A | 3/1981 | Wells |
| 4,259,185 A | 3/1981 | Mixon |
| 4,264,826 A | 4/1981 | Ullmann |
| 4,270,974 A | 6/1981 | Greenfield et al. |
| 4,273,658 A | 6/1981 | Karman |
| 4,276,115 A | 6/1981 | Greenfield et al. |
| 4,285,578 A | 8/1981 | Yamashita et al. |
| 4,300,924 A | 11/1981 | Coyle |
| 4,306,858 A | 12/1981 | Simon |
| 4,336,101 A | 6/1982 | Greenfield et al. |
| 4,346,660 A | 8/1982 | McGill |
| RE31,185 E | 3/1983 | Greenfield et al. |
| 4,430,046 A | 2/1984 | Cirrito |
| 4,432,914 A | 2/1984 | Schiffner |
| 4,440,098 A | 4/1984 | Adams |
| 4,445,464 A | 5/1984 | Gerstmann et al. |
| 4,445,842 A | 5/1984 | Syska |
| 4,450,901 A | 5/1984 | Janssen |
| 4,474,477 A | 10/1984 | Smith et al. |
| 4,485,746 A | 12/1984 | Erlandsson |
| 4,496,314 A | 1/1985 | Clarke |
| 4,518,458 A | 5/1985 | Greenfield et al. |
| 4,538,982 A | 9/1985 | McGill et al. |
| 4,583,936 A | 4/1986 | Krieger |
| 4,608,120 A | 8/1986 | Greenfield et al. |
| 4,613,409 A | 9/1986 | Volland |
| 4,642,919 A | 2/1987 | Werner et al. |
| 4,648,973 A | 3/1987 | Hultholm et al. |
| 4,652,233 A | 3/1987 | Hamazaki et al. |
| 4,658,736 A | 4/1987 | Walter |
| 4,683,062 A | 7/1987 | Krovak et al. |
| 4,689,156 A | 8/1987 | Zibrida |
| 4,693,304 A | 9/1987 | Volland |
| 4,761,077 A | 8/1988 | Werner |
| 4,771,708 A | 9/1988 | Douglass, Jr. |
| 4,818,392 A | 4/1989 | Werner et al. |
| 4,838,184 A | 6/1989 | Young et al. |
| 4,863,644 A | 9/1989 | Harrington et al. |
| 4,877,532 A | 10/1989 | Haentjens et al. |
| 4,882,009 A | 11/1989 | Santoleri et al. |
| 4,890,672 A | 1/1990 | Hall |

(56) References Cited

U.S. PATENT DOCUMENTS

| | | |
|---|---|---|
| 4,909,730 A | 3/1990 | Roussakis et al. |
| 4,913,065 A | 4/1990 | Hemsath |
| 4,917,577 A | 4/1990 | Stirling |
| 4,938,899 A | 7/1990 | Oros et al. |
| 4,952,137 A | 8/1990 | Schwartz et al. |
| 4,954,147 A | 9/1990 | Galgon |
| 4,961,703 A | 10/1990 | Morgan |
| 4,971,214 A | 11/1990 | Lillywhite et al. |
| 5,004,484 A | 4/1991 | Stirling et al. |
| 5,009,511 A | 4/1991 | Sarko et al. |
| 5,028,298 A | 7/1991 | Baba et al. |
| 5,030,428 A | 7/1991 | Dorr et al. |
| 5,032,230 A | 7/1991 | Shepherd |
| 5,043,104 A | 8/1991 | Stirling |
| 5,045,202 A | 9/1991 | Stearns et al. |
| 5,068,092 A | 11/1991 | Aschauer |
| 5,076,895 A | 12/1991 | Greenfield et al. |
| 5,085,809 A | 2/1992 | Stirling |
| 5,092,909 A | 3/1992 | Werner et al. |
| 5,102,503 A | 4/1992 | Silinski et al. |
| 5,131,757 A | 7/1992 | Smith |
| 5,132,090 A | 7/1992 | Volland |
| 5,154,898 A | 10/1992 | Ajinkya et al. |
| 5,167,821 A | 12/1992 | Tanbo et al. |
| 5,176,798 A | 1/1993 | Rodden |
| 5,183,563 A | 2/1993 | Rodden |
| 5,227,017 A | 7/1993 | Tanaka et al. |
| 5,230,167 A | 7/1993 | Lahoda et al. |
| 5,238,580 A | 8/1993 | Singhvi |
| 5,279,356 A | 1/1994 | Bruhn |
| 5,279,646 A | 1/1994 | Schwab |
| 5,300,123 A | 4/1994 | Grott |
| 5,314,622 A | 5/1994 | Stirling |
| 5,336,284 A | 8/1994 | Schifftner |
| 5,342,482 A | 8/1994 | Duesel, Jr. |
| D350,838 S | 9/1994 | Johnson |
| 5,347,958 A | 9/1994 | Gordon, Jr. |
| 5,423,979 A | 6/1995 | Allen |
| 5,460,511 A | 10/1995 | Grahn |
| 5,484,471 A | 1/1996 | Schwab |
| 5,512,085 A | 4/1996 | Schwab |
| 5,527,984 A | 6/1996 | Stultz et al. |
| 5,585,005 A | 12/1996 | Smith et al. |
| 5,630,913 A | 5/1997 | Tajer-Ardebili |
| 5,632,864 A | 5/1997 | Enneper |
| 5,636,623 A | 6/1997 | Panz et al. |
| 5,648,048 A | 7/1997 | Kuroda et al. |
| 5,656,155 A | 8/1997 | Norcross et al. |
| 5,662,802 A | 9/1997 | Heins et al. |
| 5,695,614 A | 12/1997 | Hording et al. |
| 5,695,643 A | 12/1997 | Brandt et al. |
| 5,735,680 A | 4/1998 | Henkelmann |
| 5,749,719 A | 5/1998 | Rajewski |
| 5,759,233 A | 6/1998 | Schwab |
| 5,810,578 A | 9/1998 | Hystad et al. |
| 5,865,618 A | 2/1999 | Hiebert |
| 5,879,563 A | 3/1999 | Garbutt |
| 5,925,223 A | 7/1999 | Simpson et al. |
| 5,934,207 A | 8/1999 | Echols et al. |
| 5,951,743 A | 9/1999 | Hsieh et al. |
| 5,958,110 A | 9/1999 | Harris et al. |
| 5,968,320 A | 10/1999 | Sprague |
| 5,968,352 A | 10/1999 | Ditzler |
| 6,007,055 A | 12/1999 | Schifftner |
| 6,085,911 A | 7/2000 | Greenleigh et al. |
| 6,119,458 A | 9/2000 | Harris et al. |
| 6,149,137 A | 11/2000 | Johnson et al. |
| 6,250,916 B1 | 6/2001 | Philippe et al. |
| 6,276,872 B1 | 8/2001 | Schmitt |
| 6,293,277 B1 | 9/2001 | Panz et al. |
| 6,332,949 B1 | 12/2001 | Beckhaus et al. |
| 6,345,495 B1 | 2/2002 | Cummings |
| 6,383,260 B1 | 5/2002 | Schwab |
| 6,391,100 B1 | 5/2002 | Hogan |
| 6,391,149 B1 | 5/2002 | Calfee et al. |
| 6,402,816 B1 | 6/2002 | Trivett et al. |
| 6,435,860 B1 | 8/2002 | Brookshire et al. |
| 6,468,389 B1 | 10/2002 | Harris et al. |
| 6,485,548 B1 | 11/2002 | Hogan |
| 6,500,216 B1 | 12/2002 | Takayasu |
| 6,585,899 B1 | 7/2003 | Edvardsson et al. |
| 6,616,733 B1 | 9/2003 | Pellegrin |
| 6,632,083 B1 | 10/2003 | Bussman et al. |
| 6,719,829 B1 | 4/2004 | Schwab |
| 6,733,636 B1 | 5/2004 | Heins |
| 6,742,337 B1 | 6/2004 | Hays et al. |
| 6,752,920 B2 | 6/2004 | Harris et al. |
| 6,913,671 B2 | 7/2005 | Bolton et al. |
| 6,919,000 B2 | 7/2005 | Klausner et al. |
| 6,926,757 B2 | 8/2005 | Kalliokoski et al. |
| 6,936,140 B2 | 8/2005 | Paxton et al. |
| 7,037,434 B2 | 5/2006 | Myers et al. |
| 7,069,991 B2 | 7/2006 | Gudmestad et al. |
| 7,073,337 B2 | 7/2006 | Mangin |
| 7,074,339 B1 | 7/2006 | Mims |
| 7,077,201 B2 | 7/2006 | Heins |
| 7,111,673 B2 | 9/2006 | Hugill |
| 7,142,298 B2 | 11/2006 | Nuspliger |
| 7,144,555 B1 | 12/2006 | Squires et al. |
| 7,150,320 B2 | 12/2006 | Heins |
| 7,156,985 B1 | 1/2007 | Frisch |
| 7,166,188 B2 | 1/2007 | Kedem et al. |
| 7,214,290 B2 | 5/2007 | Duesel, Jr. et al. |
| 7,225,620 B2 | 6/2007 | Klausner et al. |
| 7,288,186 B2 | 10/2007 | Harris |
| 7,332,010 B2 | 2/2008 | Steiner |
| 7,402,247 B2 | 7/2008 | Sutton |
| 7,416,172 B2 | 8/2008 | Duesel, Jr. et al. |
| 7,416,177 B2 | 8/2008 | Suzuki et al. |
| 7,424,999 B2 | 9/2008 | Xu et al. |
| 7,428,926 B2 | 9/2008 | Heins |
| 7,438,129 B2 | 10/2008 | Heins |
| 7,442,035 B2 | 10/2008 | Duesel, Jr. et al. |
| 7,459,135 B2 | 12/2008 | Pieterse et al. |
| 7,572,626 B2 | 8/2009 | Frisch et al. |
| 7,591,309 B2 | 9/2009 | Minnich et al. |
| 7,614,367 B1 | 11/2009 | Frick |
| 7,661,662 B2 | 2/2010 | Forstmanis |
| 7,681,643 B2 | 3/2010 | Heins |
| 7,717,174 B2 | 5/2010 | Heins |
| 7,758,819 B2 | 7/2010 | Nagelhout |
| 7,832,714 B2 | 11/2010 | Duesel, Jr. et al. |
| 7,955,419 B2 | 6/2011 | Casella |
| 8,066,844 B2 | 11/2011 | Duesel, Jr. et al. |
| 8,066,845 B2 | 11/2011 | Duesel, Jr. et al. |
| 8,114,287 B2 | 2/2012 | Harris |
| 8,136,797 B2 | 3/2012 | Duesel, Jr. et al. |
| 8,459,984 B2 * | 6/2013 | Duesel, Jr. ............... F23G 7/08 431/202 |
| 8,518,257 B2 | 8/2013 | Galgon et al. |
| 8,535,538 B1 | 9/2013 | Keeling et al. |
| 8,557,117 B2 | 10/2013 | Galgon et al. |
| 8,568,557 B2 | 10/2013 | Duesel, Jr. et al. |
| 8,623,174 B1 | 1/2014 | Duesel, Jr. et al. |
| 8,679,291 B2 | 3/2014 | Duesel, Jr. et al. |
| 8,721,771 B2 * | 5/2014 | Duesel, Jr. ............... B01D 1/14 110/203 |
| 8,821,728 B2 | 9/2014 | Galgon et al. |
| 8,882,967 B1 | 11/2014 | Patel |
| 9,199,861 B2 | 12/2015 | Duesel, Jr. et al. |
| 9,296,624 B2 * | 3/2016 | Duesel, Jr. ............ B01D 1/0058 |
| 2001/0013666 A1 | 8/2001 | Nomura et al. |
| 2002/0069838 A1 | 6/2002 | Rautenbach et al. |
| 2003/0104778 A1 | 6/2003 | Liu |
| 2003/0127226 A1 | 7/2003 | Heins |
| 2004/0000515 A1 | 1/2004 | Harris et al. |
| 2004/0031424 A1 | 2/2004 | Pope |
| 2004/0040671 A1 | 3/2004 | Duesel et al. |
| 2004/0045681 A1 | 3/2004 | Bolton et al. |
| 2004/0045682 A1 | 3/2004 | Liprie |
| 2004/0079491 A1 | 4/2004 | Harris et al. |
| 2005/0022989 A1 | 2/2005 | Heins |
| 2005/0049449 A1 | 3/2005 | Forrester |
| 2005/0074712 A1 | 4/2005 | Brookshire et al. |

(56) References Cited

U.S. PATENT DOCUMENTS

| | | |
|---|---|---|
| 2005/0230238 A1 | 10/2005 | Klausner et al. |
| 2005/0242036 A1 | 11/2005 | Harris |
| 2005/0274669 A1 | 12/2005 | Marchesseault et al. |
| 2005/0279500 A1 | 12/2005 | Heins |
| 2006/0000355 A1 | 1/2006 | Ogura et al. |
| 2006/0032630 A1 | 2/2006 | Heins |
| 2007/0045100 A1 | 3/2007 | Wright |
| 2007/0051513 A1 | 3/2007 | Heins |
| 2007/0084808 A1 | 4/2007 | Williamson et al. |
| 2007/0102154 A1 | 5/2007 | Grott |
| 2007/0114683 A1 | 5/2007 | Duesel et al. |
| 2007/0175189 A1 | 8/2007 | Gomiciaga-Pereda et al. |
| 2007/0251650 A1 | 11/2007 | Duesel et al. |
| 2008/0110417 A1 | 5/2008 | Smith |
| 2008/0115361 A1 | 5/2008 | Santini et al. |
| 2008/0173176 A1 | 7/2008 | Duesel et al. |
| 2008/0173590 A1 | 7/2008 | Duesel et al. |
| 2008/0174033 A1 | 7/2008 | Duesel et al. |
| 2008/0213137 A1 | 9/2008 | Frisch et al. |
| 2008/0265446 A1 | 10/2008 | Duesel et al. |
| 2008/0272506 A1 | 11/2008 | Duesel et al. |
| 2008/0277262 A1 | 11/2008 | Harris |
| 2009/0014387 A1 | 1/2009 | Probst |
| 2009/0020481 A1 | 1/2009 | Bailie et al. |
| 2009/0078416 A1 | 3/2009 | Heins |
| 2009/0127091 A1 | 5/2009 | Heins |
| 2009/0294074 A1 | 12/2009 | Forstmanis |
| 2009/0294377 A1 | 12/2009 | Gallot |
| 2010/0038310 A1 | 2/2010 | Shafer et al. |
| 2010/0095763 A1 | 4/2010 | Harris |
| 2010/0125044 A1 | 5/2010 | Keister |
| 2010/0126931 A1 | 5/2010 | Capeau et al. |
| 2010/0139871 A1 | 6/2010 | Rasmussen et al. |
| 2010/0176042 A1 | 7/2010 | Duesel, Jr. et al. |
| 2010/0224364 A1 | 9/2010 | Heins |
| 2010/0224561 A1 | 9/2010 | Marcin |
| 2010/0236724 A1 | 9/2010 | Duesel, Jr. et al. |
| 2010/0264068 A1 | 10/2010 | Ikebe et al. |
| 2011/0005999 A1 | 1/2011 | Randal |
| 2011/0061816 A1 | 3/2011 | Duesel, Jr. et al. |
| 2011/0083556 A1 | 4/2011 | Duesel, Jr. et al. |
| 2011/0100924 A1 | 5/2011 | Duesel, Jr. et al. |
| 2011/0108471 A1 | 5/2011 | Page et al. |
| 2011/0132815 A1 | 6/2011 | Angelilli et al. |
| 2011/0137465 A1 | 6/2011 | Angelilli et al. |
| 2011/0147195 A1 | 6/2011 | Shapiro et al. |
| 2011/0168646 A1 | 7/2011 | Tafoya |
| 2011/0174447 A1 | 7/2011 | Duesel, Jr. et al. |
| 2011/0180470 A1 | 7/2011 | Harris |
| 2011/0240540 A1 | 10/2011 | Harris |
| 2012/0012309 A1 | 1/2012 | Noles, Jr. |
| 2012/0171091 A1 | 7/2012 | DiTommaso et al. |
| 2012/0186451 A1 | 7/2012 | Duesel, Jr. et al. |
| 2012/0205303 A1 | 8/2012 | Rosine et al. |
| 2012/0211441 A1 | 8/2012 | Harris |
| 2012/0273367 A1 | 11/2012 | Themy et al. |
| 2012/0279925 A1 | 11/2012 | Miller et al. |
| 2012/0292176 A1 | 11/2012 | Machhammmer et al. |
| 2013/0037223 A1 | 2/2013 | Duesel, Jr. |
| 2013/0048562 A1 | 2/2013 | Keister |
| 2013/0048575 A1 | 2/2013 | Gruber et al. |
| 2014/0041811 A1 | 2/2014 | Duesel, Jr. et al. |
| 2014/0083938 A1 | 3/2014 | Galgon et al. |

FOREIGN PATENT DOCUMENTS

| | | |
|---|---|---|
| CN | 101445290 A | 6/2009 |
| DE | 556 455 C | 8/1932 |
| DE | 1 173 429 B | 7/1964 |
| EP | 0 047 044 A1 | 3/1982 |
| EP | 1371790 A1 | 12/2003 |
| EP | 1 482 243 A1 | 12/2004 |
| FR | 2 441 817 A1 | 6/1980 |
| GB | 383570 A | 11/1932 |
| GB | 463770 A | 4/1937 |
| JP | 60257801 | 12/1985 |
| JP | 62121687 | 6/1987 |
| JP | 06-142448 A | 5/1994 |
| JP | 2003/021471 A | 1/2003 |
| JP | 2004-097866 A | 4/2004 |
| JP | 2004-249226 A | 9/2004 |
| JP | 2007117874 A | 5/2007 |
| KR | 200195548 Y1 | 9/2000 |
| WO | WO-96/10544 A2 | 4/1996 |
| WO | WO-2004/022487 A2 | 3/2004 |
| WO | WO-2005/110608 A1 | 11/2005 |
| WO | WO-2008/112793 A1 | 9/2008 |
| WO | WO-2009/071763 A1 | 6/2009 |
| WO | WO-2010/092265 A1 | 8/2010 |
| WO | WO-2011/032275 A1 | 3/2011 |
| WO | WO-2011/042693 A2 | 4/2011 |
| WO | WO-2011/050317 A2 | 4/2011 |
| WO | WO-2012/100074 A2 | 7/2012 |

OTHER PUBLICATIONS

Search Report for PCT/US2014/015007, mailed Nov. 12, 2014.
Written Opinion for PCT/US2014/015007, mailed Nov. 12, 2014.
English translation of Chinese Office Action for Application No. 201080034380.0., dated Nov. 11, 2013.
Japanese Office Action for Patent Application No. 2011-550282, dispatched on May 14, 2014.
English Translation of First Office Action in Russian Application No. 2012104408 dated Aug. 12, 2014.
English Translation of Office Action in Japanese Application No. 2012523024 dated Jul. 2, 2014.
English translation of Chinese Office Action for Application No. 2010800343800, dated Jul. 1, 2014.
International Search Report and Written Opinion for Application No. PCT/US2013/074971, dated May 22, 2014.
International Preliminary Report on Patentability for Application No. PCT/US2014/022307, dated Sep. 15, 2015.
Jones, "Liquid Circulation in a Draft-Tube Bubble Column," *Chemical Engineering Science*, 40(3):449-462 (1985).
Talbert et al., "The Elecrospouted Bed," *IEEE Transactions on Industry Applications*, vol. 1A-20, No. 5, pp. 1220-1223 (1984).
Fox et al., "Control Mechanisms of Flulidized Solids Circulation Between Adjacent Vessels," *AIChE Journal*, 35(12):1933-1941 (1989).
Smith, "Sludge-U-Like, As the Ban on Sea Disposal of Sewage Waste Looms, Technologies That Can Deliver Cleaner, Thicker and More Farmer-Friendly Sludges Are Gaining Popularity," *Water Bulletin*, 708 (1996).
Durkee et al., "Field Tests of Salt Recovery System for Spent Pickle Brine," *Journal of Food Service*, 38:507-511 (1973).
English-language translation of Hage, H., "The MeMon Experiment: A Step towards Large-Scale Processing of Manure," Applied Science, 4 (1988).
St. Onge et al., "Start-Up, Testing, and Performance of the First Bulb-Type Hydroelectric Project in the U.S.A.," *IEEE Transactions on Power Apparatus Systems*, PAS—101(6):1313-1321 (1982).
German Kurz, "Immersion Heater," OI U. Gasfeuerung, 18(3):171-180 (1973). English-language abstract only.
Hattori et al., "Fluid and Solids Flow Affecting the Solids Circulation Rate in Spouted Beds with a Draft Tube," *Journal of Chemical Engineering of Japan*, 37(9):1085-1091 (2004).
Yeh et al., "Double-Pass Heat or Mass Transfer Through a Parallel-Plate Channel with Recycle," *International Journal of Hat and Mass Transfer*, 43:487-491 (2000).
International Preliminary Report on Patentability for Application No. PCT/US2008/056702, dated Sep. 15, 2009.
International Search Report and Written Opinion for Application No. PCT/US08/56702, dated Jun. 10, 2008.
International Search Report and Written Opinion for Application No. PCT/US2010/024143, dated Oct. 12, 2010.
Mueller et al., "Rotating Disk Looks Promising for Plant Wastes," (2007).

(56) References Cited

OTHER PUBLICATIONS

Claflin, "Intraparticle Conduction Effects on the Temperature Profiles in Spouted Beds," Chemeca 85, paper D9b, The Thirteenth Australasian Conference on Chemical Engineering, Perth, Australia, pp. 471-475 (1985).
Dunn, "Incineration's Role in Ultimate Disposal of Process Wastes," *Chemical Engineering, Deskbook Issue*, pp. 141-150 (1975).
Fan et al., "Some Remarks on Hydrodynamic Behavior of a Draft Tube Gas-Liquid-Solid Fluidized Bed," AIChE Symposium Series, No. 234(80):91-97 (1985).
Etzensperger et al., "Phenol Degradation in a Three-Phase Biofilm Fluidized Sand Bed Reactor," *Bioprocess Engineering*, 4:175-181 (1989).
Yoshino et al., "Removal and Recovery of Phosphate and Ammonium as Struvite from Supernatant in Anaerobic Digestion," *Water Science and Technology*, 48(1):171-178 (2003).
Hocevar et al., "The Influence of Draft-Tube Pressure Pulsations on the Cavitation-Vortex Dynamics in a Francis Turbine," *Journal of Mechanical Engineering*, 49:484-498 (2003).
Padial et al., "Three-Dimensional Simulation of a Three-Phase Draft-Tube Bubble Column," *Chemical Engineering Science*, 55:3261-3273 (2000).
Swaminathan et al., "Some Aerodynamic Aspects of Spouted Beds of Grains," Department of Chemical Engineering, McGill University, Montreal, Quebec, Canada, pp. 197-204 (2007).
Williams et al., "Aspects of Submerged Combustion As a Heat Exchange Method," *Trans IChemE*, 71(A):308-309 (1993).
Sathyanarayana et al., Circular C.W. Intake System—A Research Opinion, Seventh Technical Conference of the British Pump Manufacturer's Association, paper 21, pp. 293-313, 1981.
Schone, "Oil Removal from Exhaust Steam and Condensate of Piston-Powered Steam Engines," *Braunkohle*, 31:82-92 (1932). English-language abstract only.
Shaw LFG Specialties, LLC, 2006 Product Catalog.
Cross et al., "Leachate Evaporation by Using Landfill Gas," Proceedings Sardinia 97, Sixth Landfill Symposium, S. Margherita di Pula, Cagliari, Italy, pp. 413-422 (1997).
Genck, "Guidelines for Crystallizer Selection and Operation," CEP, pp. 26-32 (2004). www.cepmagazine.org.
Written Opinion for Application No. PCT/US2010/024143, dated Oct. 12, 2010.
Shimizu et al., "Filtration Characteristics of Hollow Fiber Microfiltration Membranes Used in Membrane Bioreactor for Domestic Wastewater Treatment," *Wat. Res.*, 30(10):2385-2392 (1996).
Miyake et al., "Performance Characteristics of High Speed-Type Cross Flow Turbine," 83-0047:2575-2583 (1993).
Ye et al., "Removal and Distribution of Iron, Manganese, Cobalt, and Nickel Within a Pennsylvania Constructed Wetland Treating Coal Combustion By-Product Leachate," *J. Environ. Qual.*, 30:1464-1473 (2001).
English language translation of an office action from Chilean Patent Application No. 237-2007.
International Preliminary Report on Patentability for Application No. PCT/US2007/001487, dated Jul. 21, 2009.
International Preliminary Report on Patentability for Application No. PCT/US2007/001632, dated Jul. 21, 2009.
International Preliminary Report on Patentability for Application No. PCT/US2007/001633, dated Jul. 21, 2009.
International Preliminary Report on Patentability for Application No. PCT/US2007/001634, dated Jul. 21, 2009.
International Search Report for Application No. PCT/US2006/028515, dated Nov. 14, 2006.
Office action from Chilean Patent Application No. 238-2007.
International Search Report and Written Opinion for Application PCT/US2011/021811, dated Mar. 21, 2011.
MikroPul, "Wet Scrubbers," (2009). www.mikropul.com.

"Gas Atomized Venturi Scrubbers," Bionomic Industries, copyright 2008, printed from www.bionomicind.com <http://www.bionomicind.com> on May 25, 2011.
"Waste Heat Recovery Systems," Bionomic Industries, copyright 2008, printed from www.bionomicind.com <http://www.bionomicind.com> on May 25, 2011.
International Search Report and Written Opinion for Application No. PCT/US10/043647, dated Apr. 27, 2011.
International Search Report and Written Opinion for Application No. PCT/US10/043648, dated Apr. 27, 2011.
EVRAS—Evaporative Reduction and Solidification Systems; Brochure for Web. Believed to be publically available as early as Mar. 5, 2010.
Hill et al., "Produced Water and Process heat Combined Provide Opportunities for Shell CO2"; EVRAS; Facilities 2000: Facilities Engineering in the Next Millennium.
Layne Evaporative Reduction and Solidification System Brochure (2010).
Intevras Technologies, LLC—Innovative solutions for water purification, remediation and process improvement; Power Point Presentation, Oct. 2009.
Office Action issued for U.S. Appl. No. 12/705,462, dated Nov. 6, 2012.
Office Action issued for U.S. Appl. No. 12/846,257, dated Nov. 16, 2012.
International Preliminary Report on Patentability and Written Opinion issued for International Patent application No. PCT/US2011/021811, dated Aug. 14, 2012.
International Search Report for Application No. PCT/US2012/021897, dated Oct. 8, 2012.
Written Opinion for Application No. PCT/US2012/021897, dated Sep. 28, 2012.
English translation of Chinese First Office Action for Application No. 201080012067.7, dated Oct. 12, 2012.
English translation of Chinese Search Report for Application No. 201080012067.7, dated Sep. 12, 2012.
U.S. Office Action for U.S. Appl. No. 12/530,484, dated Apr. 16, 2013.
U.S. Office Action for U.S. Appl. No. 12/846,337, dated Apr. 17, 2013.
Rule 62 EPC Communication issued from the European Patent Office for Application No. 10741828.7, dated Jan. 31, 2013.
Rule 62 EPC Communication issued from the European Patent Office for Application No. 10805027.9, dated Feb. 5, 2013.
Rule 62 EPC Communication issued from the European Patent Office for Application No. 10805026.1, dated Feb. 27, 2013.
International Preliminary Report on Patentability for Application No. PCT/US2010/043647, dated Feb. 9, 2012.
International Preliminary Report on Patentability for Application No. PCT/US2010/043648, dated Feb. 9, 2012.
Shaw LFG Specialties, LCC "Waste Heat Leachate Evaporator System" (2011).
Mussatti, Daniel, Section 6, Particulate Matter Controls. Chapter 2 Wet Scrubbers for Particulate Matter. Innovative Strategies and Economics Group. United States Environmental Protection Agency. Jul. 2002.
Office Action for U.S. Appl. No. 12/530,484, dated Feb. 29, 2012.
Office Action for U.S. Appl. No. 12/530,484, dated Oct. 17, 2012.
Office Action for U.S. Appl. No. 12/530,484, dated Apr. 16, 2013.
Office Action for U.S. Appl. No. 12/846,337, dated Apr. 17, 2013.
Chinese Office Action for Application No. 201180014846.5, dated Jun. 18, 2013.
Gaudlip et al; "Marcellus Shale Water Management Challenges in Pennsylvania," SPE Shale Gas Production Conference, Fort Worth (2008).
Search Report for Chinese Patent Application No. 201180014846.5, dated Jun. 8, 2013.
Alabovskij et al., "Concentration of Boiler Washing Water in Submerged-Combustion Devices," Promyshl. Energet, 4:38-39 (1975). English-language abstract only.
Bachand et al., "Denitrification in Constructed Free-Water Surface Wetlands: II. Effects of Vegetation and Temperature," Ecological Engineering, 14:17-32 (2000).

(56) References Cited

OTHER PUBLICATIONS

Barrett et al., "The Industrial Potential and Economic Viability of Spouted Bed Processes," Chemeca 85, paper D4c, The Thirteenth Australasian Conference on Chemical Engineering, Perth, Australia, pp. 401-405 (1985).
Bennett et al., "Design of a Software Application for the Simulation and Control of Continuous and Batch Crystallizer Circuits," Advances in Engineering Software, 33:365-374 (2002).
Berg, "The Development of the Controlled Buoyancy System for Installation of Submerged Pipelines," Journal AWWA, Water Technology/Quality, pp. 214-218 (1977).
Brandt et al., "Treatment Process for Waste Water Disposal of the "Morcinek" Mine Using Coalbed Methane," Conference on Coalbed Methane Utilization, Oct. 5-7, 1994.
Cherednichenko et al., "Disposal of Saline Wastes From Petroleum Refineries, All-Union Scientific-Research and Planning-Design Institute of the Petroleum Refining and Petrochemical Industry," Khimiya I Tekhnologiya Topliv I Masel, 9:37-39 (1974). Translated.
Claflin et al., "The Use of Spouted Beds for the Heat Treatment of Grains," Chemeca 81, The 9th Australasian Conference on Chemical Engineering, Christchurch, New Zealand, 4:65-72 (1981).
Final Office Action for U.S. Appl. No. 11/625,002, dated May 26, 2010.
Final Office Action for U.S. Appl. No. 11/625,022, dated Jan. 24, 2011.
Final Office Action for U.S. Appl. No. 11/625,024, dated Dec. 8, 2010.
International Preliminary Report on Patentability for Application No. PCT/US2006/015803, dated Nov. 13, 2007.
International Preliminary Report on Patentability for Application No. PCT/US2006/028515, dated Jan. 22, 2008.
International Preliminary Report on Patentability for Application No. PCT/US2012/021897, dated Aug. 1, 2013.
International Preliminary Report on Patentability for Application No. PCT/US2012/021897, dated Jul. 23, 2013.
International Search Report and Written Opinion for Application No. PCT/US2006/015803, dated Oct. 30, 2007.
LFG Specialties, LLC, Waste Heat Leachate Evaporator System, Jan. 14, 2011.
Notice of Allowance for U.S. Appl. No. 11/625,159, dated Jul. 9, 2010.
Office Action for U.S. Appl. No. 11/625,002, dated Jan. 6, 2010.
Office Action for U.S. Appl. No. 11/625,022, dated Jun. 22, 2010.
Office Action for U.S. Appl. No. 11/625,024, dated Jun. 18, 2010.
Screen shots from video on LFG website taken Jan. 18, 2011 (http://www.shawgrp.com/markets/envservices/envsolidwaste/swlfg).
"Gas Atomized Venturi Scrubbers," Bionomic Industries, copyright 2008, printed from www.bionomicind.com http://www.bionomicind.com on May 25, 2011.
International Preliminary Report on Patentability for International application No. PCT/US2013/051315, dated Jan. 20, 2015.
International Search Report and Written Opinion for Application No. PCT/US2013/051315, dated Nov. 26, 2013.
Office Action for U.S. Appl. No. 11/625,024, dated Nov. 27, 2009.
Supplementary Partial European Search Report for Application No. EP13820641.2, dated Feb. 11, 2016.
Notice of Reasons for Refusal for Japanese Application No. 2012-523025, dated Apr. 15, 2015.
Notice of Reasons for Refusal for Japanese Application No. 2012-523026, dated Apr. 15, 2015.
Office Action for U.S. Appl. No. 13/649,535, dated Sep. 26, 2014.
"Waste Heat Recovery Systems," Bionomic Industries, copyright 2008, printed from www.bionomicind.com_http://www.bionomicind.com on May 25, 2011.
Alabovskij et al., "Concentration of Boiler Washing Water in Submerged-Combustion Devices," *Promyshl. Energet*, 4:38-39 (1975). English-lanuage abstract only.
International Preliminary Report on Patentability for application No. PCT/US2014/063818, dated May 10, 2016.
International Preliminary Report on Patentability for International application No. PCT/US2013/074971, dated Jun. 16, 2015.
International Preliminary Report on Patentability for International application No. PCT/US2014/022307, dated Sep. 15, 2015.
International Search Report for International application No. PCT/US2014/063818, dated Feb. 25, 2015.
Partial International Search Report for Application No. PCT/US2016/029434, dated Jul. 15, 2016.
Search Report for PCT/US2014/022307, dated Jun. 10, 2014.
Supplementary European Search Report for Application No. 13820641, dated Jun. 6, 2016.
U.S. Appl. No. 13/849,274, filed Mar. 22, 2013.
Written Opinion for International application No. PCT/US2014/063818, dated Feb. 25, 2015.
Written Opinion for PCT/US2014/022307, dated Jun. 10, 2014.

* cited by examiner

COMPACT WASTEWATER CONCENTRATOR USING WASTE HEAT

FIELD OF THE DISCLOSURE

This application relates generally to liquid concentrators, and more specifically to compact, portable, inexpensive wastewater concentrators that can be easily connected to and use sources of waste heat.

BACKGROUND

Concentration of volatile substances can be an effective form of treatment or pretreatment for a broad variety of wastewater streams and may be carried out within various types of commercial processing systems. At high levels of concentration, many wastewater streams may be reduced to residual material in the form of slurries containing high levels of dissolved and suspended solids. Such concentrated residual may be readily solidified by conventional techniques for disposal within landfills or, as applicable, delivered to downstream processes for further treatment prior to final disposal. Concentrating wastewater can greatly reduce freight costs and required storage capacity and may be beneficial in downstream processes where materials are recovered from the wastewater.

Characteristics of industrial wastewater streams are very broad as a result of the large number of industrial processes that produce them. In addition to wastewater produced by design under controlled conditions within industry, uncontrolled events arising from accidents and natural disasters frequently generate wastewater. Techniques for managing wastewater include: direct discharge to sewage treatment plants; pretreatment followed by discharge to sewage treatment plants; on-site or off-site processes to reclaim valuable constituents; and on-site or off-site treatment to simply prepare the wastewater for ultimate disposal. Where the wastewater source is an uncontrolled event, effective containment and recovery techniques must be included with any of these options.

An important measure of the effectiveness of a wastewater concentration process is the volume of residual produced in proportion to the volume of wastewater entering the process. In particular, low ratios of residual volume to feed volume (high levels of concentration) are the most desirable. Where the wastewater contains dissolved and/or suspended non-volatile matter, the volume reduction that may be achieved in a particular concentration process that relies on evaporation of volatiles is, to a great extent, limited by the method chosen to transfer heat to the process fluid.

Conventional processes that affect concentration by evaporation of water and other volatile substances may be classified as direct or indirect heat transfer systems depending upon the method employed to transfer heat to the liquid undergoing concentration (the process fluid). Indirect heat transfer devices generally include jacketed vessels that contain the process fluid, or plate, bayonet tube or coil type heat exchangers that are immersed within the process fluid. Mediums such as steam or hot oil are passed through the jackets or heat exchangers in order to transfer the heat required for evaporation. Direct heat transfer devices implement processes where the heating medium is brought into direct contact with the process fluid, which occurs in, for example, submerged combustion gas systems.

Indirect heat transfer systems that rely on heat exchangers such as jackets, plates, bayonet tubes or coils are generally limited by the buildup of deposits of solids on the surfaces of the heat exchangers that come into direct contact with the process fluid. Also, the design of such systems is complicated by the need for a separate process to transfer heat energy to the heating medium such as a steam boiler or devices used to heat other heat transfer fluids such as hot oil heaters. This design leads to dependence on two indirect heat transfer systems to support the concentration process. Feed streams that produce deposits on heat exchangers while undergoing processing are called fouling fluids. Where feed streams contain certain compounds such as carbonates for which solubility decreases with increasing temperature, deposits, generally known as boiler scale, will form even at relatively low concentrations due to the elevated temperatures at the surfaces of the heat exchangers. Further, when compounds that have high solubility at elevated temperatures such as sodium chloride are present in the wastewater feed, they will also form deposits by precipitating out of the solution as the process fluid reaches high concentrations. Such deposits, which necessitate frequent cycles of heat exchange surface cleaning to maintain process efficiency, may be any combination of suspended solids carried into the process with the wastewater feed and solids that precipitate out of the process fluid. The deleterious effects of deposition of solids on heat exchange surfaces limits the length of time that indirect heat transfer processes may be operated before these processes must be shut down for periodic cleaning. These deleterious effects thereby impose practical limits on the range of wastewater that might be effectively managed, especially when the range of wastewater includes fouling fluids. Therefore, processes that rely on indirect heat transfer mechanisms are generally unsuitable for concentrating wide varieties of wastewater streams and achieving low ratios of residual to feed volume.

U.S. Pat. No. 5,342,482, which is hereby incorporated by reference, discloses a particular type of direct heat transfer concentrator in the form of a submerged gas process wherein combustion gas is generated and delivered though an inlet pipe to a dispersal unit submerged within the process fluid. The dispersal unit includes a number of spaced-apart gas delivery pipes extending radially outwardly from the inlet pipe, each of the gas delivery pipes having small holes spaced apart at various locations on the surface of the gas delivery pipe to disperse the combustion gas as small bubbles as uniformly as practical across the cross-sectional area of the liquid held within a processing vessel. According to current understanding within the prior art, this design provides desirable intimate contact between the liquid and the hot gas over a large interfacial surface area. In this process, the intent is that both heat and mass transfer occur at the dynamic and continuously renewable interfacial surface area formed by the dispersion of a gas phase in a process fluid, and not at solid heat exchange surfaces on which deposition of solid particles can occur. Thus, this submerged gas concentrator process provides a significant advantage over conventional indirect heat transfer processes. However, the small holes in the gas delivery pipes that are used to distribute hot gases into the process fluid within the device of U.S. Pat. No. 5,342,482 are subject to blockages by deposits of solids formed from fouling fluids. Thus, the inlet pipe that delivers hot gases to the process fluid is subject to the buildup of deposits of solids.

Further, as the result of the need to disperse large volumes of gas throughout a continuous process liquid phase, the containment vessel within U.S. Pat. No. 5,342,482 generally requires significant cross-sectional area. The inner surfaces of such containment vessels and any appurtenances installed within them are collectively referred to as the "wetted surfaces" of the process. These wetted surfaces must withstand varying concentrations of hot process fluids while the system is in operation. For systems designed to treat a broad range of wastewater streams, the materials of construction for the wetted surfaces present critical design decisions in relation to both corrosion and temperature resistance which must be balanced against the cost of equipment and the costs of maintenance/replacement over time. Generally speaking, durability and low maintenance/replacement costs for wetted surfaces are enhanced by selecting either high grades of metal alloys or certain engineered plastics such as those used in manufacturing fiberglass vessels. However, conventional concentration processes that employ either indirect or direct heating systems also require means for hot mediums such as steam, heat transfer oil or gases to transfer heat to the fluid within the vessel. While various different high alloys offer answers in regard to corrosion and temperature resistance, the costs of the vessels and the appurtenances fabricated from them are generally quite high. Further, while engineered plastics may be used either directly to form the containment vessel or as coatings on the wetted surfaces, temperature resistance is generally a limiting factor for many engineered plastics. For example, the high surface temperatures of the inlet pipe for hot gas within vessels used in U.S. Pat. No. 5,342,482 imposes such limits. Thus, the vessels and other equipment used for these processes are typically very expensive to manufacture and maintain.

Moreover, in all of these systems, a source of heat is required to perform the concentration or evaporative processes. Numerous systems have been developed to use heat generated by various sources, such as heat generated in an engine, in a combustion chamber, in a gas compression process, etc., as a source of heat for wastewater processing. One example of such a system is disclosed in U.S. Pat. No. 7,214,290 in which heat is generated by combusting landfill gas within a submerged combustion gas evaporator, which is used to process leachate at a landfill site. U.S. Pat. No. 7,416,172 discloses a submerged gas evaporator in which waste heat may be provided to an input of the gas evaporator to be used in concentrating or evaporating liquids. While waste heat is generally considered to be a cheap source of energy, to be used effectively in a wastewater processing operation, the waste heat must in many cases be transported a significant distance from the source of the waste heat to a location at which the evaporative or concentration process is to be performed. For example, in many cases, a landfill operation will have electricity generators which use one or more internal combustion engines operating with landfill gas as a combustion fuel. The exhaust of these generators or engines, which is typically piped through a muffler and an exhaust stack to the atmosphere at the top of a building containing the electrical generators, is a source of waste heat. However, to collect and use this waste heat, significant amounts of expensive piping and ductwork must be coupled to the exhaust stack to transfer the waste heat to location of the processing system, which will usually be at ground level away from the building containing the generators. Importantly, the piping, ducting materials, and control devices (e.g., throttling and shutoff valves) that can withstand the high temperatures (e.g., 1800 degrees Fahrenheit) of the exhaust gases within the exhaust stack are very expensive and must be insulated to retain the heat within the exhaust gases during transport. Acceptable insulating materials used for such purposes are generally prone to failure due to a variety of characteristics that add complexity to the design such as brittleness, tendencies to erode over time, and sensitivity to thermal cycling. Insulation also increases the weight of the piping, ducting, and control devices, which adds costs to structural support requirements.

SUMMARY

A compact liquid concentrating device disclosed herein may be easily connected to a source of waste heat, such as a landfill gas flare or a combustion engine exhaust stack, and use this waste heat to perform a direct heat transfer concentration process without the need of large and expensive containment vessels and without a lot of expensive high temperature resistant materials. The compact liquid concentrator includes a gas inlet, a gas exit and a mixing or flow corridor connecting the gas inlet and the gas exit, wherein the flow corridor includes a narrowed portion that accelerates the gas through the flow corridor. A liquid inlet located between the gas inlet and the narrowed portion of the flow corridor, injects liquid into the gas stream at a point prior to the narrowed portion so that the gas-liquid mixture is thoroughly mixed within the flow corridor, causing a portion of the liquid to be evaporated or concentrated. A demister or fluid scrubber downstream of the narrowed portion, and connected to the gas exit, removes entrained liquid droplets from the gas stream and re-circulates the removed liquid to the liquid inlet through a re-circulating circuit. Fresh liquid to be concentrated is also introduced into the re-circulating circuit at a rate sufficient to offset the combined total of liquid evaporated in the flow corridor and any concentrated liquid that is withdrawn from the process.

The compact liquid concentrator described herein includes a number of attributes that operate to cost-effectively concentrate wastewater streams having broad ranges of characteristics. The concentrator is resistant to corrosive effects over a broad range of feed characteristics, has reasonable manufacturing and operating costs, is able to operate continuously at high levels of concentration, and efficiently utilizes heat energy directly from a wide variety of sources. Moreover, the concentrator is compact enough to be portable, and so may be easily transported to locations where wastewater is generated through uncontrolled events and can be installed in close proximity to waste heat sources. Thus, the concentrator disclosed herein is a cost-effective, reliable and durable device that operates to continuously concentrate a broad range of different types of wastewater streams, and that eliminates the use of conventional solid-surface heat exchangers found in conventional indirect heat transfer systems which lead to clogging and deposit buildups.

DETAILED DESCRIPTION

Figure 1:
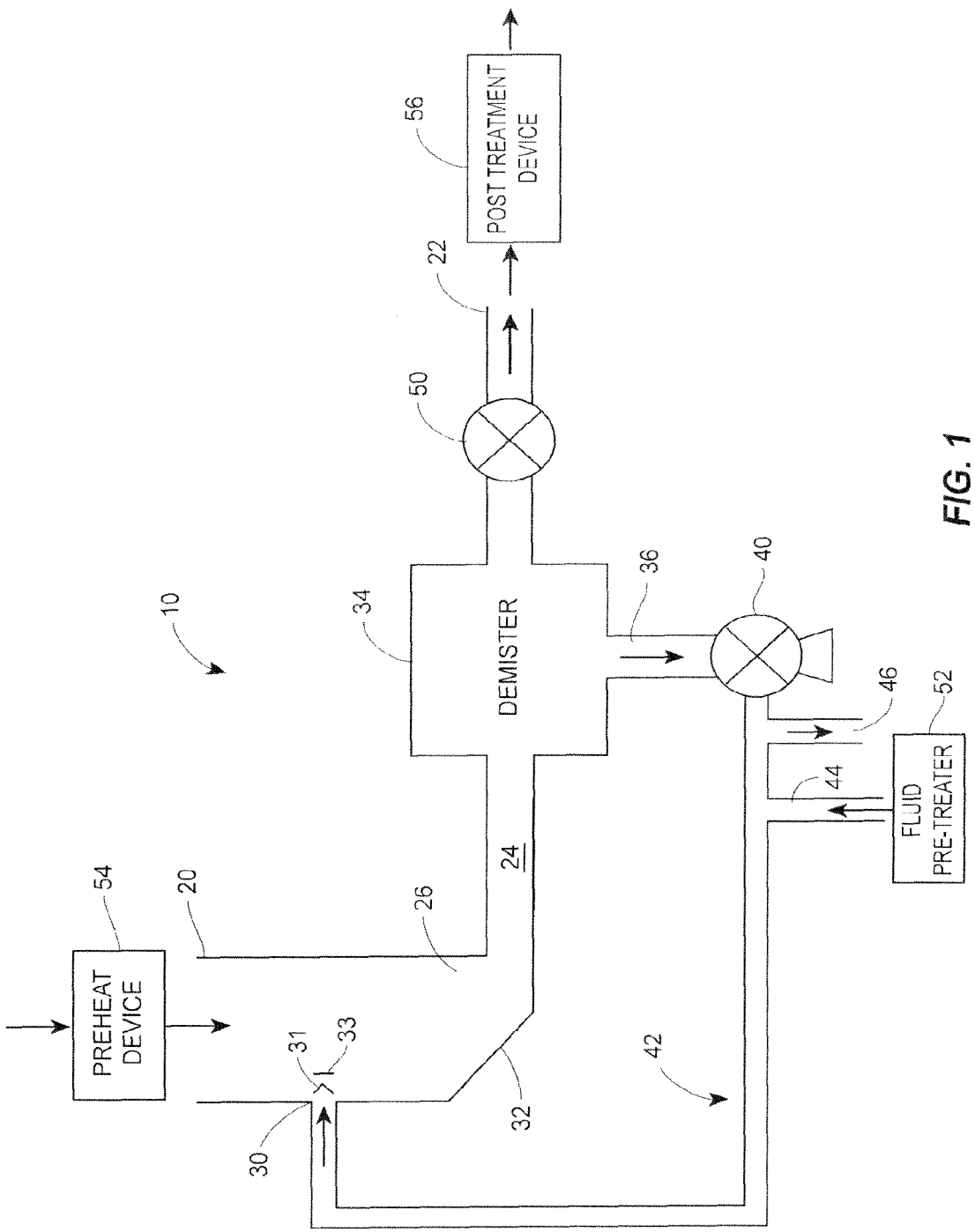
FIG. 1 is a general schematic diagram of a compact liquid concentrator.

FIG. 1 depicts a generalized schematic diagram of a liquid concentrator 10 that includes a gas inlet 20, a gas exit 22 and a flow corridor 24 connecting the gas inlet 20 to the gas exit 22. The flow corridor 24 includes a narrowed portion 26 that accelerates the flow of gas through the flow corridor 24 creating turbulent flow within the flow corridor 24 at or near this location. The narrowed portion 26 in this embodiment may formed by a venturi device. A liquid inlet 30 injects a liquid to be concentrated (via evaporation) into a liquid concentration chamber in the flow corridor 24 at a point upstream of the narrowed portion 26, and the injected liquid joins with the gas flow in the flow corridor 24. The liquid inlet 30 may include one or more replaceable nozzles 31 for spraying the liquid into the flow corridor 24. The inlet 30, whether or not equipped with a nozzle 31, may introduce the liquid in any direction from perpendicular to parallel to the gas flow as the gas moves through the flow corridor 24. A baffle 33 may also be located near the liquid inlet 30 such that liquid introduced from the liquid inlet 30 impinges on the baffle and disperses into the flow corridor in small droplets.

As the gas and liquid flow through the narrowed portion 26, the venturi principle creates an accelerated and turbulent flow that thoroughly mixes the gas and liquid in the flow corridor 24 at and after the location of the inlet 30. As a result of the turbulent mixing, a portion of the liquid rapidly vaporizes and becomes part of the gas stream. As the gas-liquid mixture moves through the narrowed portion 26, the direction and/or velocity of the gas/liquid mixture may be changed by an adjustable flow restriction, such as a venturi plate 32, which is generally used to create a large pressure difference in the flow corridor 24 upstream and downstream of the venturi plate 32. The venturi plate 32 may be adjustable to control the size and/or shape of the narrowed portion 26 and may be manufactured from a corrosion resistant material including a high alloy metal such as those manufactured under the trade names of Hastelloy®, Inconel® and Monel®.

After leaving the narrowed portion 26, the gas-liquid mixture passes through a demister 34 (also referred to as a fluid scrubber) coupled to the gas exit 22. The demister 34 removes entrained liquid droplets from the gas stream. The demister 34 includes a gas-flow passage. The removed liquid collects in a liquid collector or sump 36 in the gas-flow passage, the sump 36 may also include a reservoir for holding the removed liquid. A pump 40 fluidly coupled to the sump 40 and/or reservoir moves the liquid through a re-circulating circuit 42 back to the liquid inlet 30 and/or flow corridor 24. In this manner, the liquid may be reduced through evaporation to a desired concentration. Fresh or new liquid to be concentrated is input to the re-circulating circuit 42 through a liquid inlet 44. This new liquid may instead be injected directly into the flow corridor 24 upstream of the venturi plate 32. The rate of fresh liquid input into the re-circulating circuit 42 may be equal to the rate of evaporation of the liquid as the gas-liquid mixture flows through the flow corridor 24 plus the rate of liquid extracted through a concentrated fluid extraction port 46 located in or near the reservoir in the sump 40. The ratio of re-circulated liquid to fresh liquid may generally be in the range of approximately 1:1 to approximately 100:1, and is usually in the range of approximately 5:1 to approximately 25:1. For example, if the re-circulating circuit 42 circulates fluid at approximately 10 gal/min, fresh or new liquid may be introduced at a rate of approximately 1 gal/min (i.e., a 10:1 ratio). A portion of the liquid may be drawn off through the extraction port 46 when the liquid in the re-circulating circuit 42 reaches a desired concentration.

After passing through the demister 34 the gas stream passes through an induction fan 50 that draws the gas through the flow corridor 24 and demister gas-flow corridor under negative pressure. Of course, the concentrator 10 could operate under positive pressure produced by a blower (not shown) prior to the liquid inlet 30. Finally, the gas is vented to the atmosphere or directed for further processing through the gas exit 22.

The concentrator 10 may include a pre-treatment system 52 for treating the liquid to be concentrated, which may be a wastewater feed. For example, an air stripper may be used as a pre-treatment system 52 to remove substances that may produce foul odors or be regulated as air pollutants. In this case, the air stripper may be any conventional type of air stripper or may be a further concentrator of the type described herein, which may be used in series as the air stripper. The pre-treatment system 52 may, if desired, heat the liquid to be concentrated using any desired heating technique. Additionally, the gas and/or wastewater feed circulating through the concentrator 10 may be pre-heated in a pre-heater 54. Pre-heating may be used to enhance the rate of evaporation and thus the rate of concentration of the liquid. The gas and/or wastewater feed may be pre-heated through combustion of renewable fuels such as wood chips, bio-gas, methane, or any other type of renewable fuel or any combination of renewable fuels, fossil fuels and waste heat. Furthermore, the gas and/or wastewater may be pre-heated through the use of waste heat generated in a landfill flare or stack. Also, waste heat from an engine, such as an internal combustion engine, may be used to pre-heat the gas and/or wastewater feed. Additionally, the gas streams ejected from the gas exit 22 of the concentrator 10 may be transferred into a flare or other post treatment device 56 which treats the gas before releasing the gas to the atmosphere.

The liquid concentrator 10 described herein may be used to concentrate a wide variety of wastewater streams, such as waste water from industry, runoff water from natural disasters (floods, hurricanes), refinery caustic, leachate such as landfill leachate, etc. The liquid concentrator 10 is practical, energy efficient, reliable, and cost-effective. In order to increase the utility of this liquid concentrator, the liquid concentrator 10 is readily adaptable to being mounted on a trailer or a moveable skid to effectively deal with wastewater streams that arise as the result of accidents or natural disasters or to routinely treat wastewater that is generated at spatially separated or remote sites. The liquid concentrator 10 described herein has all of these desirable characteristics and provides significant advantages over conventional wastewater concentrators, especially when the goal is to manage a broad variety of wastewater streams.

Moreover, the concentrator 10 may be largely fabricated from highly corrosion resistant, yet low cost materials such as fiberglass and/or other engineered plastics. This is due, in part, to the fact that the disclosed concentrator is designed to operate under minimal differential pressure. For example, a differential pressure generally in the range of only 10 to 30 inches water column is required. Also, because the gas-liquid contact zones of the concentration processes generate high turbulence within narrowed (compact) passages at or directly after the venturi section of the flow path, the overall design is very compact as compared to conventional concentrators where the gas liquid contact occurs in large process vessels. As a result, the amount of high alloy metals required for the concentrator 10 is quite minimal. Also, because these high alloy parts are small and can be readily replaced in a short period of time with minimal labor, fabrication costs may be cut to an even higher degree by designing some or all of these parts to be wear items manufactured from lesser quality alloys that are to be replaced at periodic intervals. If desired, these lesser quality alloys (e.g., carbon steel) may be coated with corrosion and/or erosion resistant liners, such as engineered plastics including elastomeric polymers, to extend the useful life of such components. Likewise, the pump 40 may be provided with corrosion and/or erosion resistant liners to extend the life of the pump 40, thus further reducing maintenance and replacement costs.

As will be understood, the liquid concentrator 10 provides direct contact of the liquid to be concentrated and the hot gas, effecting highly turbulent heat exchange and mass transfer between hot gas and the liquid, e.g., wastewater, undergoing concentration. Moreover, the concentrator 10 employs highly compact gas-liquid contact zones, making it minimal in size as compared to known concentrators. The direct contact heat exchange feature promotes high energy efficiency and eliminates the need for solid surface heat exchangers as used in conventional, indirect heat transfer concentrators. Further, the compact gas-liquid contact zone eliminates the bulky process vessels used in both conventional indirect and direct heat exchange concentrators. These features allow the concentrator 10 to be manufactured using comparatively low cost fabrication techniques and with reduced weight as compared to conventional concentrators. Both of these factors favor portability and cost-effectiveness. Thus, the liquid concentrator 10 is more compact and lighter in weight than conventional concentrators, which make it ideal for use as a portable unit. Additionally, the liquid concentrator 10 is less prone to fouling and blockages due to the direct contact heat exchange operation and the lack of solid heat exchanger surfaces. The liquid concentrator 10 can also process liquids with significant amounts of suspended solids because of the direct contact heat exchange. As a result, high levels of concentration of the process fluids may be achieved without need for frequent cleaning of the concentrator 10.

More specifically, in liquid concentrators that employ indirect heat transfer, the heat exchangers are prone to fouling and are subject to accelerated effects of corrosion at the normal operating temperatures of the hot heat transfer medium that is circulated within them (steam or other hot fluid). Each of these factors places significant limits on the durability and/or costs of building conventional indirectly heated concentrators, and on how long they may be operated before it is necessary to shutdown and clean or repair the heat exchangers. By eliminating the bulky process vessels, the weight of the liquid concentrators and both the initial costs and the replacement costs for high alloy components are greatly reduced. Moreover, due to the temperature difference between the gas and liquid, the relatively small volume of liquid contained within the system, and the reduced relative humidity of the gas prior to mixing with the liquid, the concentrator 10 operates at close to the adiabatic saturation temperature for the particular gas/liquid mixture, which is typically in the range of about 150 degrees Fahrenheit to about 215 degrees Fahrenheit (i.e., this concentrator is a "low momentum" concentrator).

Moreover, the concentrator 10 is designed to operate under negative pressure, a feature that greatly enhances the ability to use a very broad range of fuel or waste heat sources as an energy source to affect evaporation. In fact, due to the draft nature of these systems, pressurized or non-pressurized burners may be used to heat and supply the gas used in the concentrator 10. Further, the simplicity and reliability of the concentrator 10 is enhanced by the minimal number of moving parts and wear parts that are required. In general, only two pumps and a single induced draft fan are required for the concentrator when it is configured to operate on waste heat such as stack gases from engines (e.g., generators or vehicle engines), industrial process stacks, gas compressor systems, and flares, such as landfill gas flares. These features provide significant advantages that reflect favorably on the versatility and the costs of buying, operating and maintaining the concentrator 10.

Figure 2:
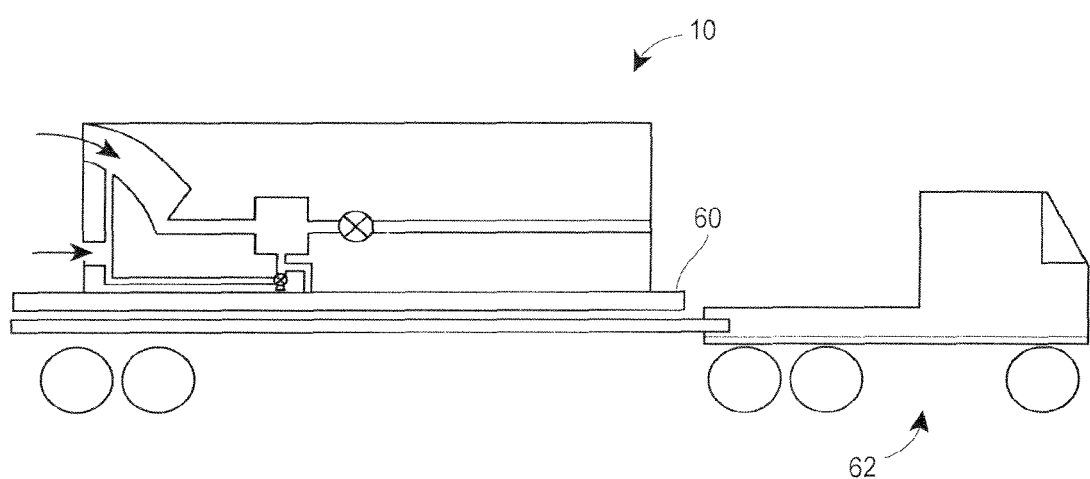
FIG. 2 depicts an embodiment of the liquid concentrator of FIG. 1 mounted on a pallet or skid for easy transportation on a truck.

FIG. 2 illustrates a side view of the liquid concentrator 10 mounted on a movable frame 60, such as a pallet, a trailer or a skid. The movable frame is sized and shaped for easy loading on, or connection to, a transportation vehicle 62, such as a tractor-trailer truck. Likewise, such a mounted concentrator may easily be loaded onto a train, a ship or an airplane (not shown) for rapid transportation to remote sites. The liquid concentrator 10 may operate as a totally self-contained unit by having its own burner and fuel supply, or the liquid concentrator 10 may operate using an on-site burner and/or an on-site fuel or waste heat source. Fuels for the concentrator 10 may include renewable fuel sources, such as waste products (paper, wood chips, etc.), and landfill gas. Moreover, the concentrator 10 may operate on any combination of traditional fossil fuels such as coal or petroleum, renewable fuels and/or waste heat.

A typical trailer-mounted concentrator 10 may be capable of treating as much as one-hundred thousand gallons or more per day of wastewater, while larger, stationary units, such as those installed at landfills, sewage treatment plants, or natural gas or oil fields, may be capable of treating multiples of one-hundred thousand gallons of wastewater per day.

Figure 3:
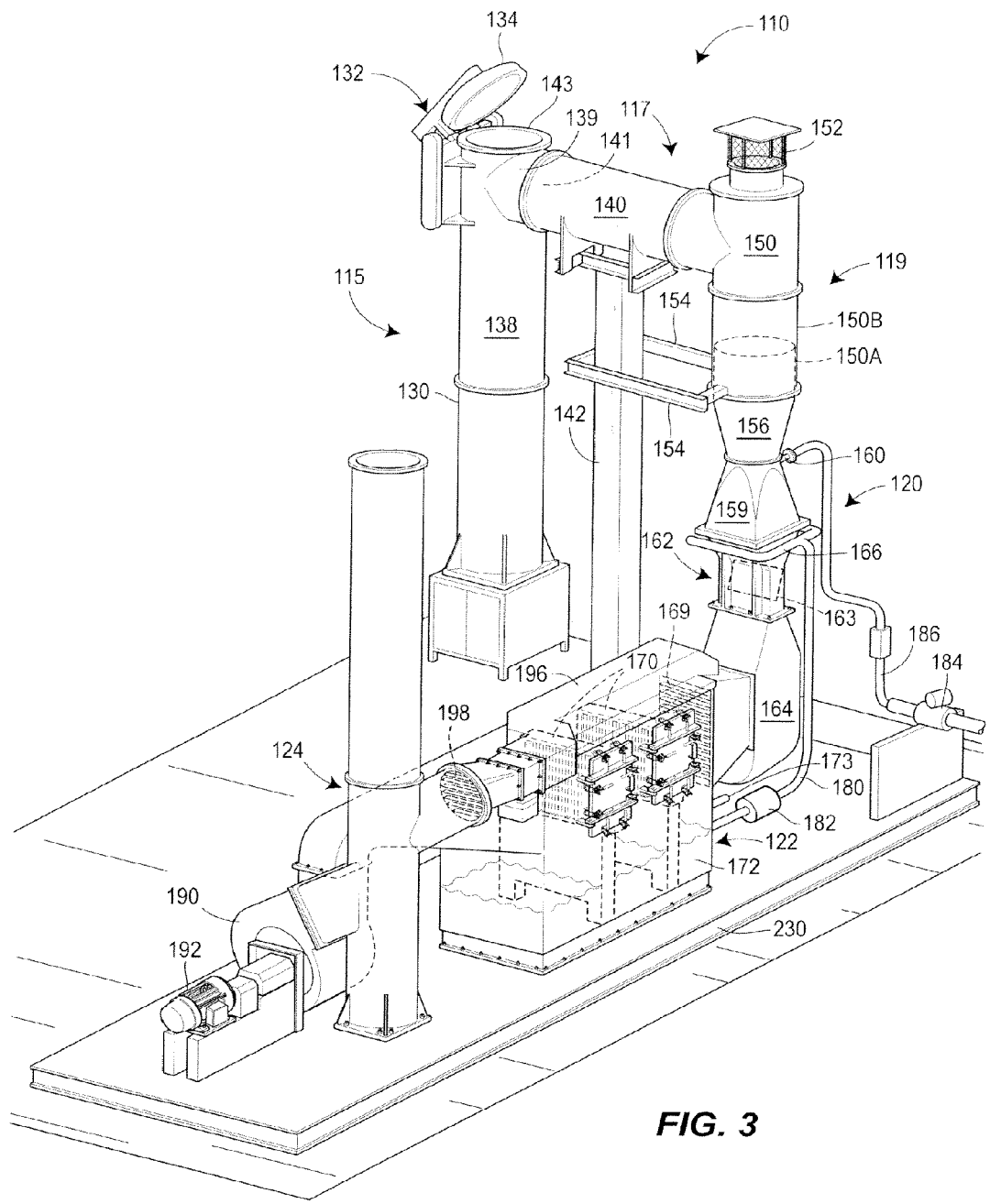
FIG. 3 is a perspective view of a compact liquid concentrator which implements the concentration process of FIG. 1, connected to a source of waste heat produced by a landfill flare.

FIG. 3 illustrates one particular embodiment of a compact liquid concentrator 110 which operates using the principles described above with respect to FIG. 1 and which is connected to a source of waste heat in the form of a landfill flare.

Generally speaking, the compact liquid concentrator 110 of FIG. 3 operates to concentrate wastewater, such as landfill leachate, using exhaust or waste heat created within a landfill flare which burns landfill gas in a manner that meets the standards set by the U.S. Environmental Protection Agency (EPA). As is known, most landfills include a flare which is used to burn landfill gas to eliminate methane and other gases prior to release to the atmosphere. Typically, the gas exiting the flare is between 1000 and 1500 degrees Fahrenheit and may reach 1800 degrees Fahrenheit.

Figure 4:
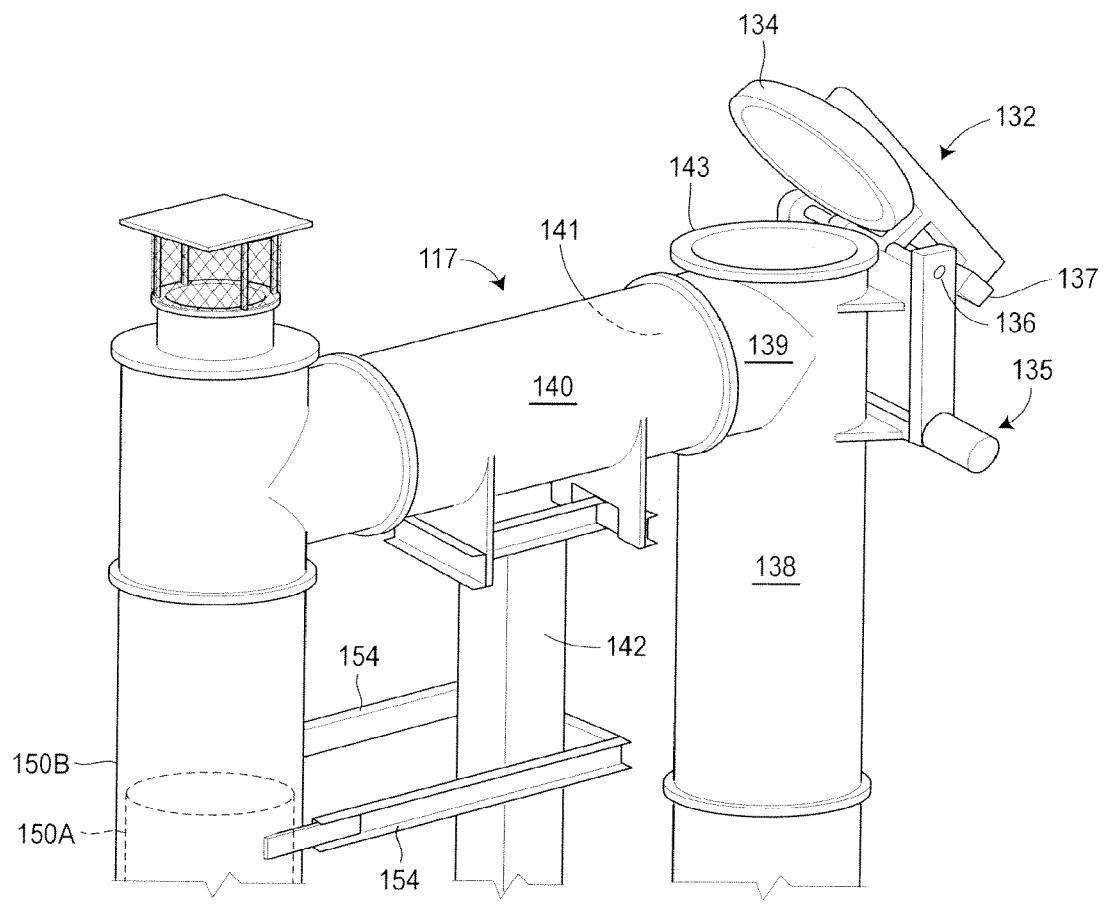
FIG. 4 is a perspective view of a heat transfer portion of the compact liquid concentrator of FIG. 3.

As illustrated in FIG. 3, the compact liquid concentrator 110 generally includes or is connected to a flare assembly 115, and includes a heat transfer assembly 117 (shown in more detail in FIG. 4), an air pre-treatment assembly 119, a concentrator assembly 120 (shown in more detail in FIG. 5), a fluid scrubber 122, and an exhaust section 124. Importantly, the flare assembly 115 includes a flare 130, which burns landfill gas therein according to any known principles, and a flare cap assembly 132. The flare cap assembly 132 includes a moveable cap 134 (e.g., a flare cap, an exhaust gas cap, etc.) which covers the top of the flare 130, or other type of stack (e.g., a combustion gas exhaust stack), to seal off the top of the flare 130 when the flare cap 134 is in the closed position, or to divert a portion of the flare gas in a partially closed position, and which allows gas produced within the flare 130 to escape to the atmosphere through an open end that forms a primary gas outlet 143, when the flare cap 134 is in an open or partially open position. The flare cap assembly 132 also includes a cap actuator 135, such as a motor (e.g., an electric motor, a hydraulic motor, a pneumatic motor, etc., shown in FIG. 4) which moves the flare cap 134 between the fully open and the fully closed positions. As shown in FIG. 4, the flare cap actuator 135 may, for example, rotate or move the flare cap 134 around a pivot point 136 to open and close the flare cap 134. The flare cap actuator 135 may utilize a chain drive or any other type of drive mechanism connected to the flare cap 134 to move the flare cap 134 around the pivot point 136. The flare cap assembly 132 may also include a counter-weight 137 disposed on the opposite side of the pivot point 136 from the flare cap 134 to balance or offset a portion of the weight of the flare cap 134 when moving the flare cap 134 around the pivot point 136. The counter-weight 137 enables the actuator 135 to be reduced in size or power while still being capable of moving or rotating the flare cap 134 between an open position, in which the top of the flare 130 (or the primary combustion gas outlet 143) is open to the atmosphere, and a closed position, in which the flare cap 134 covers and essentially seals the top of the flare 130 (or the primary combustion gas outlet 143). The flare cap 134 itself may be made of high temperature resistant material, such as stainless steel or carbon steel, and may be lined or insulated with refractory material including aluminum oxide and/or zirconium oxide on the bottom portion thereof which comes into direct contact with the hot flare gases when the flare cap 134 is in the closed position.

If desired, the flare 130 may include an adapter section 138 including the primary combustion gas outlet 143 and a secondary combustion gas outlet 141 upstream of the primary combustion gas outlet 143. When the flare cap 130 is in the closed position, combustion gas is diverted through the secondary combustion gas outlet 141. The adapter section 138 may include a connector section 139 that connects the flare 130 (or exhaust stack) to the heat transfer section 117 using a 90 degree elbow or turn. Other connector arrangements are possible. For example, the flare 130 and heat transfer section 117 may be connected at virtually any angle between 0 degrees and 180 degrees. In this case, the flare cap assembly 132 is mounted on the top of the adaptor section 138 proximate the primary combustion gas outlet 143.

As illustrated in FIGS. 3 and 4, the heat transfer assembly 117 includes a transfer pipe 140, which connects to an inlet of the air pre-treatment assembly 119 to the flare 130 and, more particularly, to the adaptor section 138 of the flare 130. A support member 142, in the form of a vertical bar or pole, supports the heat transfer pipe 140 between the flare 130 and the air pre-treatment assembly 119 at a predetermined level or height above the ground. The heat transfer pipe 140 is connected to the connector section 139 or the adapter section 138 at the secondary combustion gas outlet 141, the transfer pipe forming a portion of a fluid passageway between the adapter section 138 and a secondary process, such as a fluid concentrating process. The support member 142 is typically necessary because the heat transfer pipe 140 will generally be made of metal, such as carbon or stainless steel, and may be refractory lined with materials such as aluminum oxide and/or zirconium oxide, to withstand the temperature of the gas being transferred from the flare 130 to the air pre-treatment assembly 119. Thus, the heat transfer pipe 140 will typically be a heavy piece of equipment. However, because the flare 130, on the one hand, and the air pre-treatment assembly 119 and the concentrator assembly 120, on the other hand, are disposed immediately adjacent to one another, the heat transfer pipe 140 generally only needs to be of a relatively short length, thereby reducing the cost of the materials used in the concentrator 110, as well as reducing the amount of support structure needed to bear the weight of the heavy parts of the concentrator 110 above the ground. As illustrated in FIG. 3, the heat transfer pipe 140 and the air pre-treatment assembly 1119 form an upside-down U-shaped structure.

The air pre-treatment assembly 119 includes a vertical piping section 150 and an ambient air valve (not shown explicitly in FIGS. 3 and 4) disposed at the top of the vertical piping section 150. The ambient air valve (also referred to as a bleed valve) forms a fluid passageway between the heat transfer pipe 140 (or air pre-treatment assembly 119) and the atmosphere. The ambient air valve operates to allow ambient air to flow through a mesh bird screen 152 (typically wire or metal) and into the interior of the air pre-treatment assembly 119 to mix with the hot gas coming from the flare 130. If desired, the air pre-treatment assembly 119 may include a permanently open section proximate to the bleed valve which always allows some amount of bleed air into the air pre-treatment assembly 119, which may be desirable to reduce the size of the required bleed valve and for safety reasons. While the control of the ambient air or bleed valve will be discussed in greater detail hereinafter, this valve generally allows the gas from the flare 130 to be cooled to a more useable temperature before entering into the concentrator assembly 120. The air pre-treatment assembly 119 may be supported in part by cross-members 154 connected to the support member 142. The cross-members 154 stabilize the air pre-treatment assembly 119, which is also typically made of heavy carbon or stainless steel or other metal, and which may be refractory-lined to improve energy efficiency and to withstand the high temperature of the gases within this section of the concentrator 110. If desired, the vertical piping section 150 may be extendable to adapt to or account for flares of differing heights so as to make the liquid concentrator 110 easily adaptable to many different flares or to flares of different heights. This concept is illustrated in more detail in FIG. 3. As shown in FIG. 3, the vertical piping section 150 may include a first section 150A (shown using dotted lines) that rides inside of a second section 150B thereby allowing the vertical piping section 150 to be adjustable in length (height).

Generally speaking, the air pre-treatment assembly 119 operates to mix ambient air provided through the ambient air valve beneath the screen 152 and the hot gas flowing from the flare 130 through the heat transfer pipe 140 to create a desired temperature of gas at the inlet of the concentrator assembly 120.

The liquid concentrator assembly 120 includes a lead-in section 156 having a reduced cross-section at the top end thereof which mates the bottom of the piping section 150 to a quencher 159 of the concentrator assembly 120. The concentrator assembly 120 also includes a first fluid inlet 160, which injects new or untreated liquid to be concentrated, such as landfill leachate, into the interior of the quencher 159. While not shown in FIG. 3, the inlet 160 may include a coarse sprayer with a large nozzle for spraying the untreated liquid into the quencher 159. Because the liquid being sprayed into the quencher 159 at this point in the system is not yet concentrated, and thus has large amount of water therein, and because the sprayer is a coarse sprayer, the sprayer nozzle is not subject to fouling or being clogged by the small particles within the liquid. As will be understood, the quencher 159 operates to quickly reduce the temperature of the gas stream (e.g., from about 900 degrees Fahrenheit to less than 200 degrees Fahrenheit) while performing a high degree of evaporation on the liquid injected at the inlet 160. If desired, but not specifically shown in FIG. 3, a temperature sensor may be located at or near the exit of the piping section 150 or in the quencher 159 and may be used to control the position of the ambient air valve to thereby control the temperature of the gas present at the inlet of the concentrator assembly 120.

Figure 5:
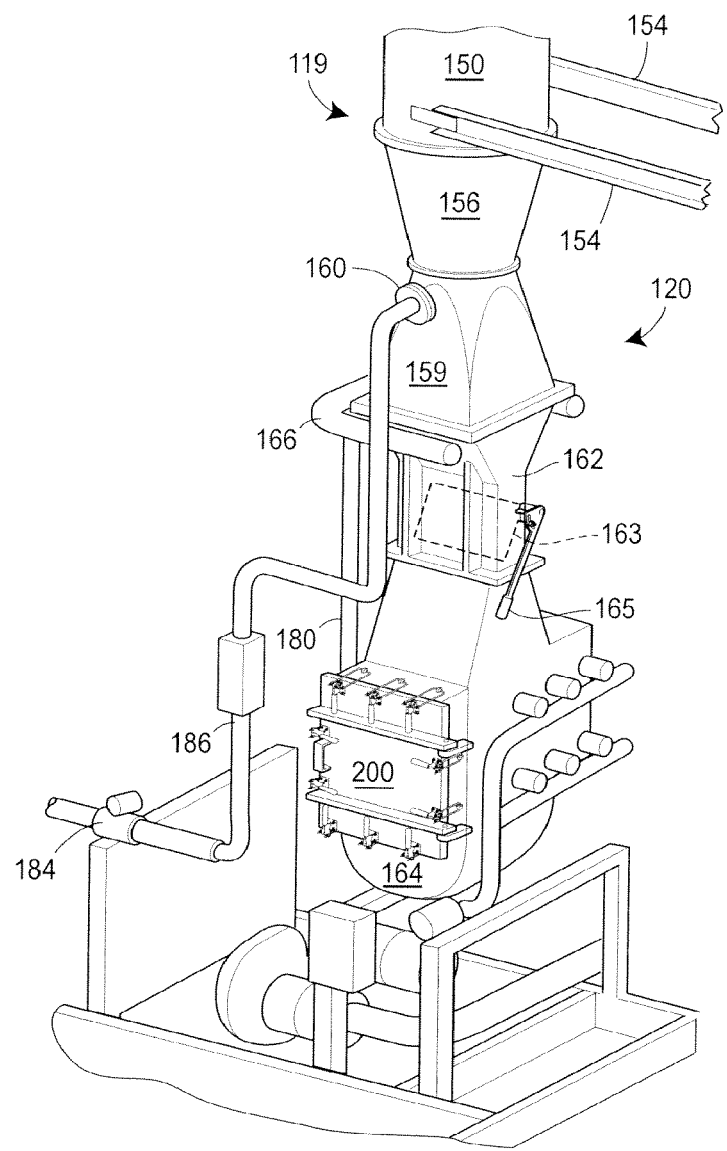
FIG. 5 is a front perspective view of an evaporator/concentrator portion of the compact liquid concentrator of FIG. 3.

As shown in FIGS. 3 and 5, the quencher 159 is connected to liquid injection chamber which is connected to narrowed portion or venturi section 162 which has a narrowed cross section with respect to the quencher 159 and which has a venturi plate 163 (shown in dotted line) disposed therein. The venturi plate 163 creates a narrow passage through the venturi section 162, which creates a large pressure drop between the entrance and the exit of the venturi section 162. This large pressure drop causes turbulent gas flow within the quencher 159 and the top or entrance of the venturi section 162, and causes a high rate of gas flow out of the venturi section 162, both of which lead to thorough mixing of the gas and liquid in the venturi section 162. The position of the venturi plate 163 may be controlled with a manual control rod 165 (shown in FIG. 5) connected to the pivot point of the plate 163, or via an electric control mechanism, such as motor (not shown in FIG. 5).

A re-circulating pipe 166 extends around opposite sides of the entrance of the venturi section 162 and operates to inject partially concentrated (i.e., re-circulated) liquid into the venturi section 162 to be further concentrated and/or to prevent the formation of dry particulate within the concentrator assembly 120 through multiple fluid entrances located on one or more sides of the flow corridor. While not explicitly shown in FIGS. 3 and 5, a number of pipes, such as three pipes of, for example, ½ inch diameter, may extend from each of the opposites legs of the pipe 166 partially surrounding the venturi section 162, and through the walls and into the interior of the venturi section 162. Because the liquid being ejected into the concentrator 110 at this point is re-circulated liquid, and is thus either partially concentrated or being maintained at a particular equilibrium concentration and more prone to plug a spray nozzle than the less concentrated liquid injected at the inlet 160, this liquid may be directly injected without a sprayer so as to prevent clogging. However, if desired, a baffle in the form of a flat plate may be disposed in front of each of the openings of the ½ pipes to cause the liquid being injected at this point in the system to hit the baffle and disperse into the concentrator assembly 120 as smaller droplets. In any event, the configuration of this re-circulating system distributes or disperses the re-circulating liquid better within the gas stream flowing through the concentrator assembly 120.

The combined hot gas and liquid flows in a turbulent manner through the venturi section 162. As noted above, the venturi section 162, which has a moveable venturi plate 163 disposed across the width of the concentrator assembly 120, causes turbulent flow and complete mixture of the liquid and gas, causing rapid evaporation of the liquid within the gas. Because the mixing action caused by the venturi section 162 provides a high degree of evaporation, the gas cools substantially in the concentrator assembly 120, and exits the venturi section 162 into a flooded elbow 164 at high rates of speed. In fact, the temperature of the gas-liquid mixture at this point may be about 160 degrees Fahrenheit.

As is typical, the bottom of the flooded elbow 164 has liquid disposed therein, and the gas-liquid mixture exiting the venturi section 162 at high rates of speed impinges on the liquid in the bottom of the flooded elbow 164 as the gas-liquid mixture is forced to turn 90 degrees to flow into the fluid scrubber 122. The interaction of the gas-liquid stream with the liquid within the flooded elbow 164 removes liquid droplets from the gas-liquid stream, and prevents suspended particles within the gas-liquid stream from hitting the bottom of flooded elbow 164 at high rates of speeds, thereby preventing erosion of the metal wall of the flooded elbow 164.

After leaving the flooded elbow 164, the gas-liquid stream in which evaporated liquid and some liquid and other particles still exist, flows through the fluid scrubber 122 which is, in this case, a cross-flow fluid scrubber. The fluid scrubber 122 includes various screens or filters which aid in removal of entrained liquids from the gas-liquid stream and removes other particles that might be present with the gas-liquid stream. In one particular example, the cross flow scrubber 122 may include an initial coarse impingement baffle 169 at the input thereof, which is designed to remove liquid droplets in the range of 50 to 100 microns in size or higher. Thereafter, two removable filters in the form of chevrons 170 are disposed across the fluid path through the fluid scrubber 122, and the chevrons 170 may be progressively sized or configured to remove liquid droplets of smaller and smaller sizes, such as 20-30 microns and less than 10 microns. Of course, more or fewer filters or chevrons could be used.

As is typical in cross flow scrubbers, liquid captured by the filters 169 and 170 gravity drains into a reservoir or sump 172 located at the bottom of the fluid scrubber 122. The sump 172, which may hold, for example 200 gallons of liquid or more, thereby collects concentrated fluid containing dissolved and suspended solids removed from the gas-liquid stream and operates as a reservoir for a source of re-circulating concentrated liquid back to the concentrator assembly 120 to be further treated and/or to prevent the formation of dry particulate within the concentrator assembly 120 in the manner described above with respect to FIG. 1. In one embodiment, the sump 172 may include a sloped V-shaped bottom (not shown in the drawings) having a V-shaped groove extending from the back of the fluid scrubber 122 (furthest away from the flooded elbow 164) to the front of the fluid scrubber 122 (closest to the flooded elbow 164), wherein the V-shaped groove is sloped such that the bottom of the V-shaped groove is lower at the end of the fluid scrubber 122 nearest the flooded elbow 164 than at an end farther away from the flooded elbow 164. In other words, the V-shaped bottom may be sloped with the lowest point of the V-shaped bottom proximate the exit port 173 and/or the pump 182. Additionally, a washing circuit (not shown in the drawings) may pump concentrated fluid from the sump 172 to a sprayer (not shown) within the cross flow scrubber 122, the sprayer being aimed to spray liquid at the V-shaped bottom. Alternatively, the sprayer may spray unconcentrated liquid or clean water at the V-shaped bottom. The sprayer may periodically or constantly spray liquid onto the surface of the V-shaped bottom to wash solids and prevent solids buildup on the V-shaped bottom or at the exit port 173 and/or the pump 182. As a result of this V-shaped sloped bottom and pump, liquid collecting in the sump 172 is continuously agitated and renewed, thereby maintaining a relatively constant consistency and maintaining solids in suspension. If desired, the spraying circuit may be a separate circuit using a separate pump with, for example, an inlet inside of the sump 173, or may use a pump 182 associated with a concentrated liquid re-circulating circuit described below to spray concentrated fluid from the sump onto the V-shaped bottom of the sump 172.

As illustrated in FIG. 3, a return line 180, as well as a pump 182, operate to re-circulate fluid removed from the gas-liquid stream from the sump 172 back to the concentrator 120 and thereby complete a fluid or liquid re-circulating circuit. Likewise, a pump 184 may be provided within an input line 186 to pump new or untreated liquid, such as landfill leachate, to the input 160 of the concentrator assembly 120. Also, one or more sprayers 185 may be disposed inside the fluid scrubber 122 adjacent the chevrons 170 and may be operated periodically to spray clean water or a portion of the wastewater feed on the chevrons 170 to keep them clean.

Concentrated liquid also be removed from the bottom of the fluid scrubber 122 via the exit port 173 and may be further processed or disposed of in any suitable manner in a secondary re-circulating circuit. In particular, the concentrated liquid removed by the exit port 173 contains a certain amount of suspended solids, which preferably may be separated from the liquid portion of the concentrated liquid and removed from the system using a secondary re-circulating circuit. For example, concentrated liquid removed from the exit port 173 may be transported through a secondary concentrated wastewater circuit (not shown) to a solid/liquid separating device, such as a settling tank, a vibrating screen, a rotary vacuum filter, or a filter press. After the suspended solids and liquid portion of the concentrated wastewater are separated by the solid/liquid separating device, the liquid portion of the concentrated wastewater may be returned to the sump 172 for further processing in the first or primary re-circulating circuit connected to the concentrator.

The gas, which flows through and out of the fluid scrubber 122 with the liquid and suspended solids removed therefrom, exits out of piping or ductwork at the back of the fluid scrubber 122 (downstream of the chevrons 170) and flows through an induced draft fan 190 of the exhaust assembly 124, from where it is exhausted to the atmosphere in the form of the cooled hot inlet gas mixed with the evaporated water vapor. Of course, an induced draft fan motor 192 is connected to and operates the fan 190 to create negative pressure within the fluid scrubber 122 so as to ultimately draw gas from the flare 130 through the transfer pipe 140, the air pre-treatment assembly 119 and the concentrator assembly 120. As described above with respect to FIG. 1, the induced draft fan 190 needs only to provide a slight negative pressure within the fluid scrubber 122 to assure proper operation of the concentrator 110.

While the speed of the induced draft fan 190 can be varied by a device such as a variable frequency drive operated to create varying levels of negative pressure within the fluid scrubber 122 and thus can usually be operated within a range of gas flow capacity to assure complete gas flow from the flare 130, if the gas being produced by the flare 130 is not of sufficient quantity, the operation of the induced draft fan 190 cannot necessarily be adjusted to assure a proper pressure drop across the fluid scrubber 122 itself. That is, to operate efficiently and properly, the gas flowing through the fluid scrubber 122 must be at a sufficient (minimal) flow rate at the input of the fluid scrubber 122. Typically this requirement is controlled by keeping at least a preset minimal pressure drop across the fluid scrubber 122. However, if the flare 130 is not producing at least a minimal level of gas, increasing the speed of the induced draft fan 190 will not be able to create the required pressure drop across the fluid scrubber 122.

To compensate for this situation, the cross flow scrubber 122 is designed to include a gas re-circulating circuit which can be used to assure that enough gas is present at the input of the fluid scrubber 122 to enable the system to acquire the needed pressure drop across the fluid scrubber 122. In particular, the gas re-circulating circuit includes a gas return line or return duct 196 which connects the high pressure side of the exhaust assembly 124 (e.g., downstream of the induced draft fan 190) to the input of the fluid scrubber 122 (e.g., a gas input of the fluid scrubber 122) and a baffle or control mechanism 198 disposed in the return duct 196 which operates to open and close the return duct 196 to thereby fluidly connect the high pressure side of the exhaust assembly 124 to the input of the fluid scrubber 122. During operation, when the gas entering into the fluid scrubber 122 is not of sufficient quantity to obtain the minimal required pressure drop across the fluid scrubber 122, the baffle 198 (which may be, for example, a gas valve, a damper such as a louvered damper, etc.) is opened to direct gas from the high pressure side of the exhaust assembly 124 (i.e., gas that has traveled through the induced draft fan 190) back to the input of the fluid scrubber 122. This operation thereby provides a sufficient quantity of gas at the input of the fluid scrubber 122 to enable the operation of the induced draft fan 190 to acquire the minimal required pressure drop across the fluid scrubber 122.

Figure 6:
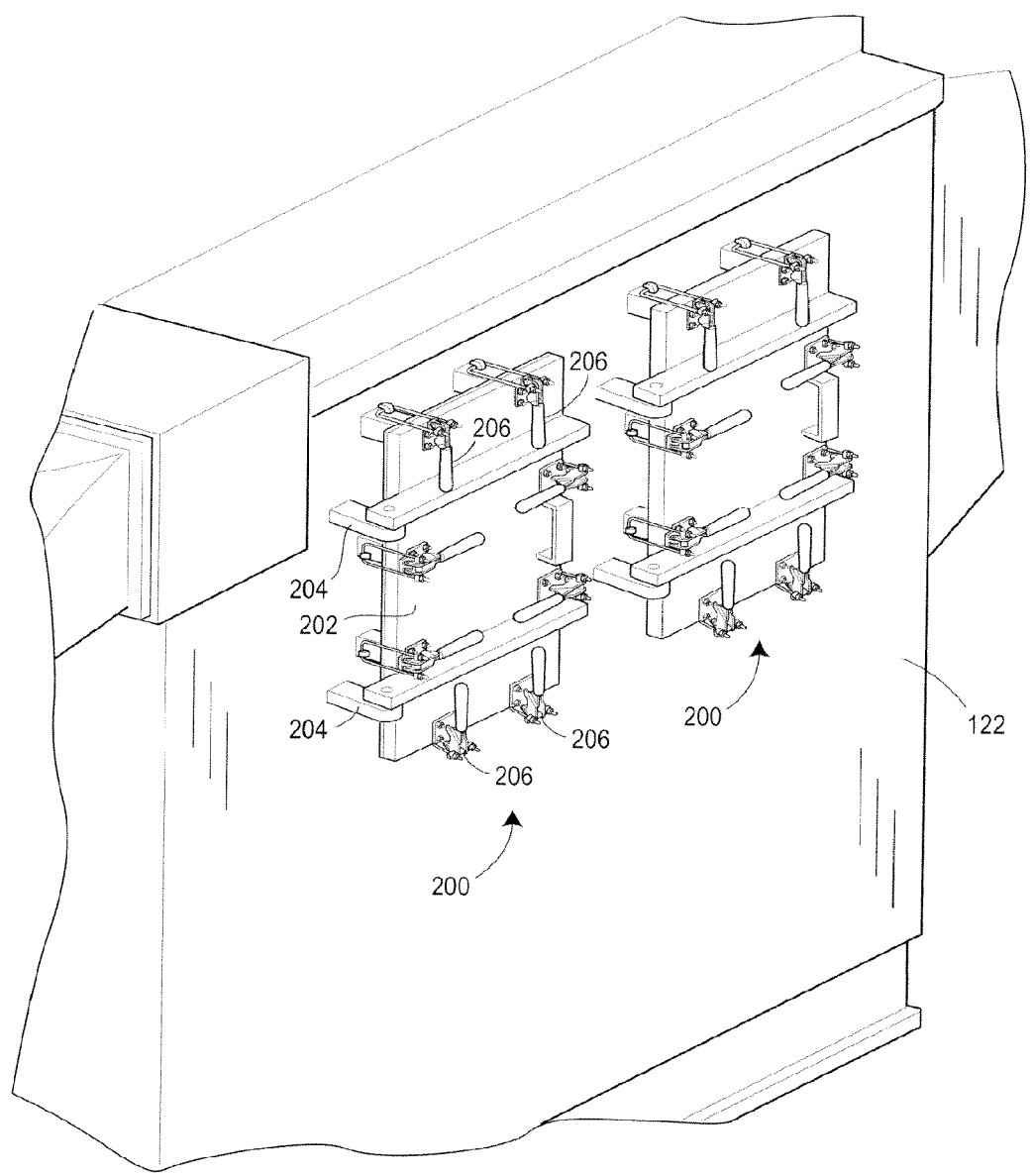
FIG. 6 is a perspective view of easy opening access doors on a portion of the compact liquid concentrator of FIG. 3.

FIG. 6 illustrates the particular advantageous feature of the compact liquid concentrator 110 of FIG. 3 in the form of a set of easy opening access doors 200 which may be used to access the inside of the concentrator 110 for cleaning and viewing purposes. While FIG. 6 illustrates easy opening access doors 200 on one side of the fluid scrubber 122, a similar set of doors may be provided on the other side of the fluid scrubber 122, and a similar door is provided on the front of the flooded elbow 164, as shown in FIG. 5. As illustrated in FIG. 6, each of the easy access doors 200 on the fluid scrubber 122 includes a door plate 202, which may be a flat piece of metal, connected to the fluid scrubber 122 via two hinges 204, with the door plate 202 being pivotable on the hinges 204 to open and close. A plurality of quick-release handles 206 are disposed around the periphery of the door plate 202 and operate to hold the door plate 202 in the closed position and so to hold the door 200 shut when the fluid scrubber 122 is operating. In the embodiment shown in FIG. 6, eight quick-release handles 206 are disposed around each of the door plates 202, although any other desired number of such quick-release handles 206 could be used instead.

Figure 7:
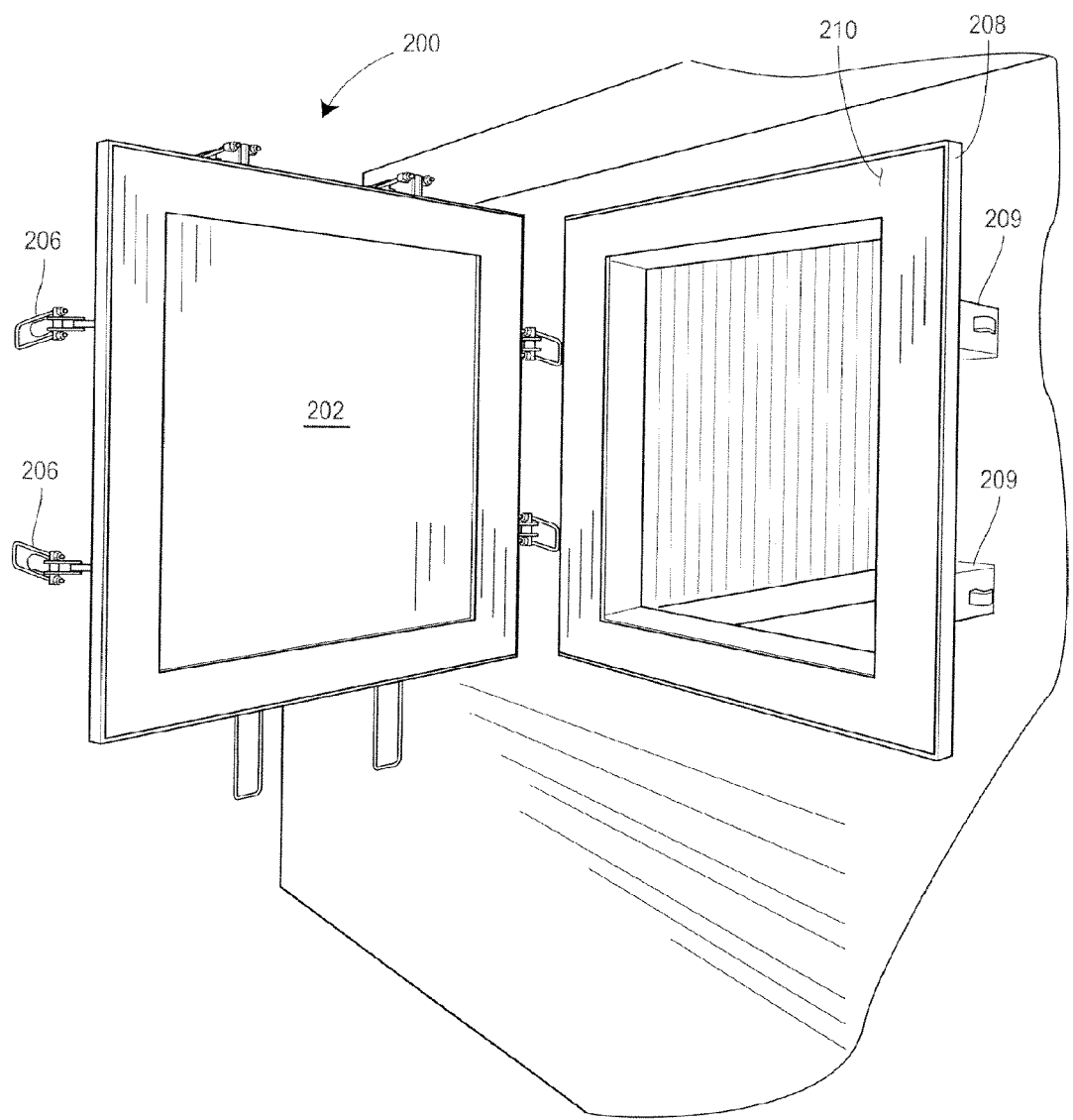
FIG. 7 is a perspective view of one of the easy opening access doors of FIG. 6 in the open position.

FIG. 7 illustrates one of the doors 200 disposed in the open position. As will be seen, a door seat 208 is mounted away from the wall of the fluid scrubber 122 with extension members 209 disposed between the door seat 208 and the outer wall of the fluid scrubber 122. A gasket 210, which may be made of rubber or other compressible material, is disposed around the circumference of the opening on the door seat 208. A similar gasket may additionally or alternatively be disposed around the outer circumference of inner side of the door plate 202, which provides for better sealing when the door 200 is in the closed position.

Figure 8:
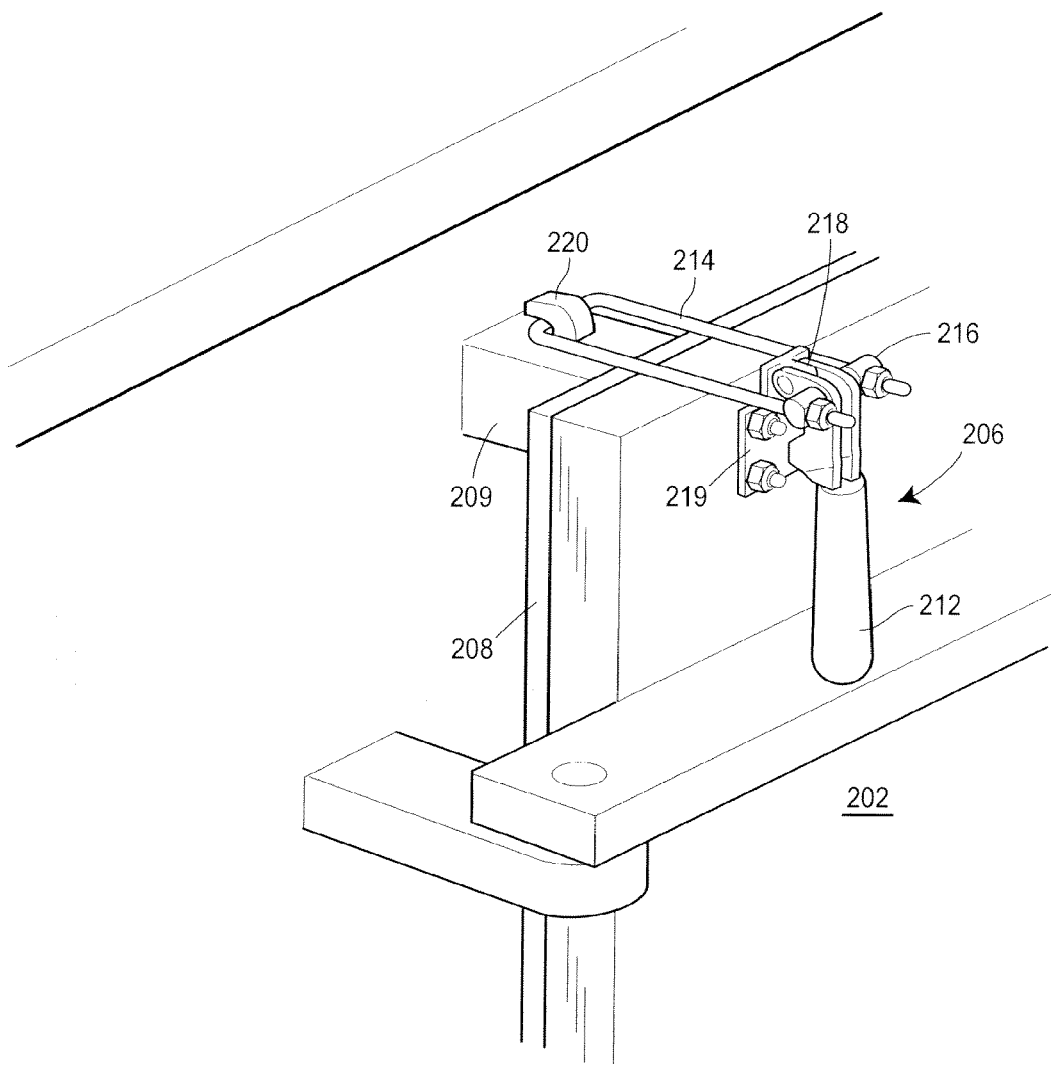
FIG. 8 is a perspective view of an easy opening latch mechanism used on the access doors of FIGS. 6 and 7.

Each quick-release handle 206, one of which is shown in more detail in FIG. 8, includes a handle 212 and a latch 214 (in this case a U-shaped piece of metal) mounted on a pivot bar 216 disposed through the handle 212. The handle 212 is mounted on a further pivot point member 218 which is mounted on the outer wall of the door plate 202 via an attachment bracket 219. The operation of the handle 212 up and around the further pivot member 218 (from the position shown in FIG. 8) moves the latch 214 towards the outer wall of the fluid scrubber 112 (when the door plate 202 is in the closed position) so that the latch 214 may be disposed on the side of a hook 220 away from the door plate 202, the hook 220 being mounted on the extension member 209. Rotation of the handle 210 back in the opposite direction pulls the latch 214 up tight against the hook 220, pulling the further pivot member 218 and therefore the door plate 202 against the door seat 208. Operation of all of the quick-release handles 206 secures the door plate 202 against door seat 208 and the gasket 210 provides for a fluidly secure connection. Thus, closing all eight of the quick-release handles 206 on a particular door 200, as illustrated in FIG. 6, provides a secure and tight-fitting mechanism for holding the door 200 closed.

The use of the easy opening doors 200 replaces the use of a plate with holes, wherein numerous bolts extending from the outer wall of the concentrator are fitted through the holes on the plate and wherein it is necessary to tighten nuts on the bolts to draw the plate against the wall of the concentrator. While such a nut and bolt type of securing mechanism, which is typically used in fluid concentrators to allow access to the interior of the concentrator, is very secure, operation of this configuration takes a long time and a lot of effort when opening or closing an access panel. The use of the quick opening doors 200 with the quick-release handles 206 of FIG. 6 may be used in this instance because the interior of the fluid scrubber 122 is under negative pressure, in which the pressure inside the fluid scrubber 122 is less than the ambient air pressure, and so does not need the security of a cumbersome bolt and nut type of access panel. Of course, as will be understood, the configuration of the doors 200 allows the doors 200 to be easily opened and closed, with only minimal manual effort, and no tools, thereby allowing for fast and easy access to the structure inside of the fluid scrubber 122, such as the impingement baffle 169 or the removable filters 170, or other parts of the concentrator 110 on which an access door 200 is disposed.

Referring back to FIG. 5, it will be seen that the front the flooded elbow 164 of the concentrator assembly 120 also includes an easy-opening access door 200, which allows easy access to the inside of the flooded elbow 164. However, similar easy opening access doors could be located on any desired part of the fluid concentrator 110, as most of the elements of the concentrator 10 operate under negative pressure.

The combination of features illustrated in FIGS. 3-8 makes for a compact fluid concentrator 110 that uses waste heat in the form of gas resulting from the operation of a landfill flare burning landfill gas, which waste heat would otherwise be vented directly to the atmosphere. Importantly, the concentrator 110 uses only a minimal amount of high temperature resistant (and thus expensive material) to provide the piping and structural equipment required to use the high temperature gases exiting from the flare 130. In particular, the small length of the transfer pipe 140, which is made of the most expensive materials, is minimized, thereby reducing the cost and weight of the fluid concentrator 110. Moreover, because of the small size of the heat transfer pipe 140, only a minimal amount of scaffolding, in the form of the support member 142, is needed thereby further reducing the costs of building the concentrator 110. Still further, the fact that the air pre-treatment assembly 119 is disposed directly on top of the fluid concentrator assembly 120, with the gas in these sections flowing downward towards the ground, enables these sections of the concentrator 110 to be supported directly by the ground or by a skid on which these members are mounted. Still further, this configuration keeps the concentrator 110 disposed very close to the flare 130, making it more compact. Likewise, this configuration keeps the high temperature sections of the concentrator 110 (e.g., the top of the flare 130, the heat transfer pipe 140 and the air pre-treatment assembly 119) above the ground and away from inadvertent human contact, leading to a safer configuration. In fact, due to the rapid cooling that takes place in the venturi section 162 of the concentrator assembly 120, the venturi section 162, the flooded elbow 164 and the fluid scrubber 122 are typically cool enough to touch without harm (even when the gases exiting the flare 130 are at 1800 degrees Fahrenheit). This fact also enables these components to be made of less expensive or lighter weight materials, such as carbon steel or fiberglass. In fact, in one embodiment, the fluid scrubber 122 is made of fiberglass, making it less expensive than higher alloys while maintaining exceptional corrosion resistance.

The fluid concentrator 110 is also a very fast-acting concentrator. Because the concentrator 110 is a direct contact type of concentrator, it is not subject to deposit buildup, clogging and fouling to the same extent as most other concentrators. Still further, the ability to control the flare cap 134 to open and close, depending on whether the concentrator 110 is being used or operated, allows the flare 130 to be used to burn landfill gas without interruption when starting and stopping the concentrator 110. More particularly, the flare cap 134 can be quickly opened at any time to allow the flare 130 to simply burn landfill gas as normal while the concentrator 110 is shut down. On the other hand, the flare cap 134 can be quickly closed when the concentrator 110 is started up, thereby diverting hot gasses created in the flare 130 to the concentrator 110, and allowing the concentrator 110 to operate without interrupting the operation of the flare 130. In either case, the concentrator 110 can be started and stopped based on the operation of the flare cap 134 without interrupting the operation of the flare 130.

If desired, the flare cap 134 may be opened to a partial amount during operation of the concentrator 110 to control the amount of gas that is transferred from the flare 130 to the concentrator 110. This operation, in conjunction with the operation of the ambient air valve, may be useful in controlling the temperature of the gas at the entrance of the venturi section 162.

Moreover, due to the compact configuration of the air pre-treatment assembly 119, the concentrator assembly 120 and the fluid scrubber 122, parts of the concentrator assembly 120, the fluid scrubber 122, the draft fan 190 and at least a lower portion of the exhaust section 124 can be permanently mounted on (connected to and supported by) a skid or plate 230, as illustrated in FIG. 3. The upper parts of the concentrator assembly 120, the air pre-treatment assembly 119 and the heat transfer pipe 140, as well as a top portion of the exhaust stack, may be removed and stored on the skid or plate 230 for transport, or may be transported in a separate truck. Because of the manner in which the lower portions of the concentrator 110 can be mounted to a skid or plate, the concentrator 110 is easy to move and install. In particular, during set up of the concentrator 110, the skid 230, with the fluid scrubber 122, the flooded elbow 164 and the draft fan 190 mounted thereon, may be offloaded at the site at which the concentrator 110 is to be used by simply offloading the skid 230 onto the ground or other containment area at which the concentrator 110 is to be assembled. Thereafter, the venturi section 162, the quencher 159, and the air pre-treatment assembly 119 may be placed on top of and attached to the flooded elbow 164. The piping section 150 may then be extended in height to match the height of the flare 130 to which the concentrator 110 is to be connected. In some cases, this may first require mounting the flare cap assembly 132 onto a pre-existing flare 130. Thereafter, the heat transfer pipe 140 may be raised to the proper height and attached between the flare 130 and the air pre-treatment assembly 119, while the support member 142 is disposed in place.

Because most of the pumps, fluid lines, sensors and electronic equipment are disposed on or are connected to the fluid concentrator assembly 120, the fluid scrubber 122 or the draft fan assembly 190, set up of the concentrator 110 at a particular site does not require a lot of fluid piping and electrical work at the site. As a result, the concentrator 110 is relatively easy to install and to set up at (and to disassemble and remove from) a particular site. Moreover, because a majority of the components of the concentrator 110 are permanently mounted to the skid 230, the concentrator 110 can be easily transported around on a truck or other delivery vehicle and can be easily dropped off and installed at particular location, such as next to a landfill flare.

Figure 9:
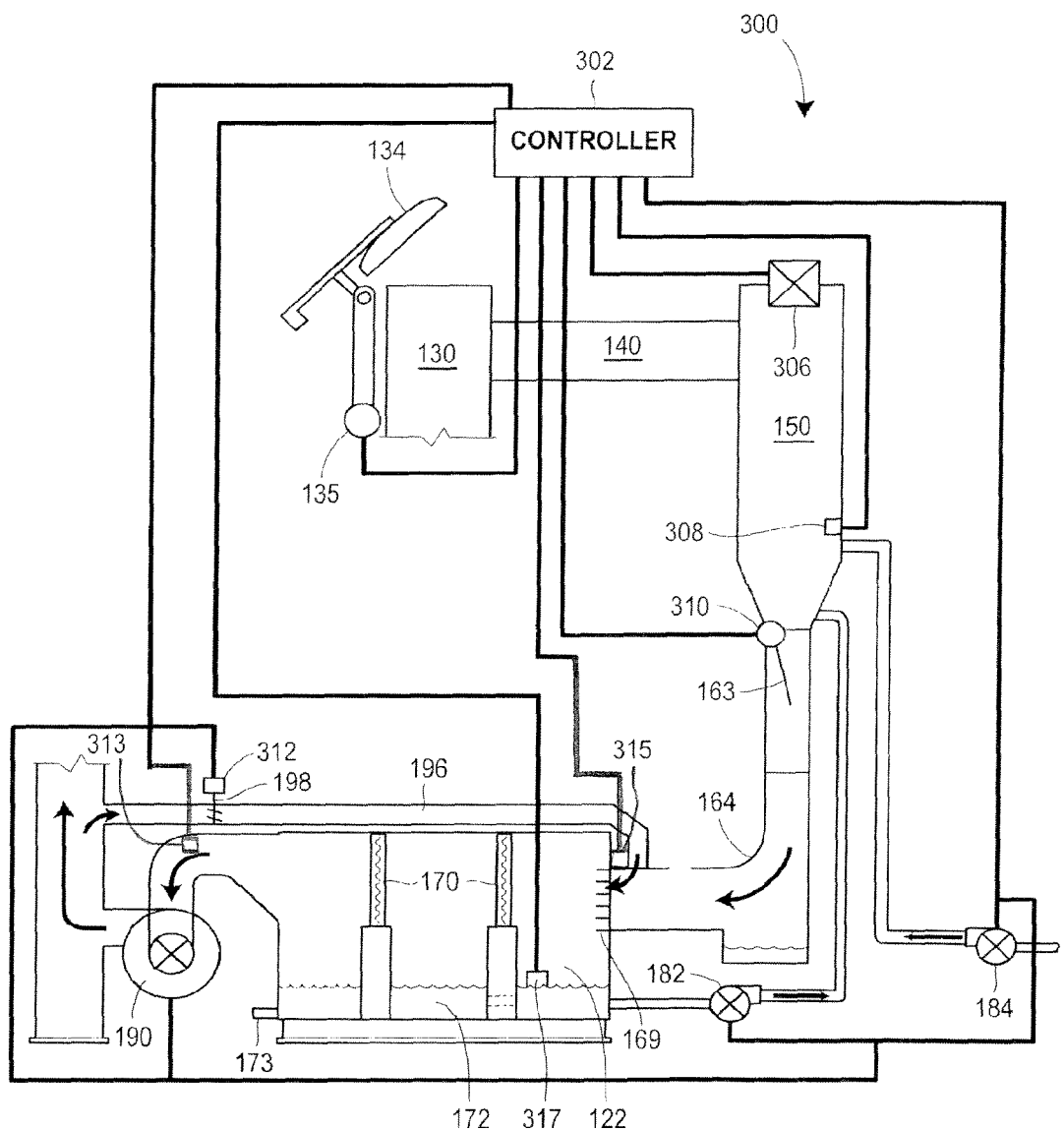
FIG. 9 is a schematic diagram of a control system which may be used in the compact liquid concentrator of FIG. 3 to control the operation of the various component parts of the compact liquid concentrator.

FIG. 9 illustrates a schematic diagram of a control system 300 that may be used to operate the concentrator 110 of FIG. 3. As illustrated in FIG. 9, the control system 300 includes a controller 302, which may be a form of digital signal processor type of controller, a programmable logic controller (PLC) which may run, for example, ladder logic based control, or any other type of controller. The controller 302 is, of course, connected to various components within the concentrator 110. In particular, the controller 302 is connected to the flare cap drive motor 135, which controls the opening and closing operation of the flare cap 134. The motor 135 may be set up to control the flare cap 134 to move between a fully open and a fully closed position. However, if desired, the controller 302 may control the drive motor 135 to open the flare cap 134 to any of a set of various different controllable positions between the fully opened and the fully closed position. The motor 135 may be continuously variable if desired, so that the flare cap 134 may be positioned at any desired point between fully open and fully closed.

Additionally, the controller 302 is connected to and controls the ambient air inlet valve 306 disposed in the air pre-treatment assembly 119 of FIG. 3 upstream of the venturi section 162 and may be used to control the pumps 182 and 184 which control the amount of and the ratio of the injection of new liquid to be treated and the re-circulating liquid being treated within the concentrator 110. The controller 302 may be operatively connected to a sump level sensor 317 (e.g., a float sensor, a non-contact sensor such as a radar unit, or a differential pressure cell). The controller 302 may use a signal from the sump level sensor 317 to control the pumps 182 and 184 to maintain the level of concentrated fluid within the sump 172 at a predetermined or desired level. Also, the controller 302 may be connected to the induced draft fan 190 to control the operation of the fan 190, which may be a single speed fan, a variable speed fan or a continuously controllable speed fan. In one embodiment, the induced draft fan 190 is driven by a variable frequency motor, so that the frequency of the motor is changed to control the speed of the fan. Moreover, the controller 302 is connected to a temperature sensor 308 disposed at, for example, the inlet of the concentrator assembly 120 or at the inlet of the venturi section 162, and receives a temperature signal generated by the temperature sensor 308. The temperature sensor 308 may alternatively be located downstream of the venturi section 162 or the temperature sensor 308 may include a pressure sensor for generating a pressure signal.

During operation and at, for example, the initiation of the concentrator 110, when the flare 130 is actually running and is thus burning landfill gas, the controller 302 may first turn on the induced draft fan 190 to create a negative pressure within the fluid scrubber 122 and the concentrator assembly 120. The controller 302 may then or at the same time, send a signal to the motor 135 to close the flare cap 134 either partially or completely, to direct waste heat from the flare 130 into the transfer pipe 140 and thus to the air pre-treatment assembly 119. Based on the temperature signal from the temperature sensor 308, the controller 302 may control the ambient air valve 306 (typically by closing this valve partially or completely) and/or the flare cap actuator to control the temperature of the gas at the inlet of the concentrator assembly 120. Generally speaking, the ambient air valve 306 may be biased in a fully open position (i.e., may be normally open) by a biasing element such as a spring, and the controller 302 may begin to close the valve 306 to control the amount of ambient air that is diverted into the air pre-treatment assembly 119 (due to the negative pressure in the air pre-treatment assembly 119), so as to cause the mixture of the ambient air and the hot gases from the flare 130 to reach a desired temperature. Additionally, if desired, the controller 302 may control the position of the flare cap 134 (anywhere from fully open to fully closed) and may control the speed of the induced draft fan 190, to control the amount of gas that enters the air pre-treatment assembly 119 from the flare 130. As will be understood, the amount of gas flowing through the concentrator 110 may need to vary depending on ambient air temperature and humidity, the temperature of the flare gas, the amount of gas exiting the flare 130, etc. The controller 302 may therefore control the temperature and the amount of gas flowing through the concentrator assembly 120 by controlling one or any combination of the ambient air control valve 306, the position of the flare cap 134 and the speed of the induced draft fan 190 based on, for example, the measurement of the temperature sensor 308 at the inlet of the concentrator assembly 120. This feedback system is desirable because, in many cases, the air coming out of a flare 130 is between 1200 and 1800 degrees Fahrenheit, which may be too hot, or hotter than required for the concentrator 110 to operate efficiently and effectively.

In any event, as illustrated in FIG. 9, the controller 302 may also be connected to a motor 310 which drives or controls the position of the venturi plate 163 within the narrowed portion of the concentrator assembly 120 to control the amount of turbulence caused within the concentrator assembly 120. Still further, the controller 302 may control the operation of the pumps 182 and 184 to control the rate at which (and the ratio at which) the pumps 182 and 184 provide re-circulating liquid and new waste fluid to be treated to the inputs of the quencher 159 and the venturi section 162. In one embodiment, the controller 302 may control the ratio of the re-circulating fluid to new fluid to be about 10:1, so that if the pump 184 is providing 8 gallons per minute of new liquid to the input 160, the re-circulating pump 182 is pumping 80 gallons per minute. Additionally, or alternatively, the controller 302 may control the flow of new liquid to be processed into the concentrator (via the pump 184) by maintaining a constant or predetermined level of concentrated liquid in the sump 172 using, for example, the level sensor 317. Of course, the amount of liquid in the sump 172 will be dependent on the rate of concentration in the concentrator, the rate at which concentrated liquid is pumped from or otherwise exists the sump 172 via the secondary re-circulating circuit and the rate at which liquid from the secondary re-circulating circuit is provided back to the sump 172, as well as the rate at which the pump 182 pumps liquid from the sump 172 for delivery to the concentrator via the primary re-circulating circuit.

If desired, one or both of the ambient air valve 306 and the flare cap 134 may be operated in a fail-safe open position, such that the flare cap 134 and the ambient air valve 306 open in the case of a failure of the system (e.g., a loss of control signal) or a shutdown of the concentrator 110. In one case, the flare cap motor 135 may be spring loaded or biased with a biasing element, such as a spring, to open the flare cap 134 or to allow the flare cap 134 to open upon loss of power to the motor 135. Alternatively, the biasing element may be the counter-weight 137 on the flare cap 134 may be so positioned that the flare cap 134 itself swings to the open position under the applied force of the counter-weight 137 when the motor 135 loses power or loses a control signal. This operation causes the flare cap 134 to open quickly, either when power is lost or when the controller 302 opens the flare cap 134, to thereby allow hot gas within the flare 130 to exit out of the top of the flare 130. Of course, other manners of causing the flare cap 134 to open upon loss of control signal can be used, including the use of a torsion spring on the pivot point 136 of the flare cap 134, a hydraulic or pressurized air system that pressurizes a cylinder to close the flare cap 134, loss of which pressure causes the flare cap 134 to open upon loss of the control signal, etc.

Thus, as will be noted from the above discussion, the combination of the flare cap 134 and the ambient air valve 306 work in unison to protect the engineered material incorporated into the concentrator 110, as whenever the system is shut down, the flare cap and the air valve 306 automatically immediately open, thereby isolating hot gas generated in the flare 130 from the process while quickly admitting ambient air to cool the process.

Moreover, in the same manner, the ambient air valve 306 may be spring biased or otherwise configured to open upon shut down of the concentrator 110 or loss of signal to the valve 306. This operation causes quick cooling of the air pre-treatment assembly 119 and the concentrator assembly 120 when the flare cap 134 opens. Moreover, because of the quick opening nature of the ambient air valve 306 and the flare cap 134, the controller 302 can quickly shut down the concentrator 110 without having to turn off or effect the operation of the flare 130.

Furthermore, as illustrated in the FIG. 9, the controller 302 may be connected to the venturi plate motor 310 or other actuator which moves or actuates the angle at which the venturi plate 163 is disposed within the venturi section 162. Using the motor 310, the controller 302 may change the angle of the venturi plate 163 to alter the gas flow through the concentrator assembly 120, thereby changing the nature of the turbulent flow of the gas through concentrator assembly 120, which may provide for better mixing of the and liquid and gas therein and obtain better or more complete evaporation of the liquid. In this case, the controller 302 may operate the speed of the pumps 182 and 184 in conjunction with the operation of the venturi plate 163 to provide for optimal concentration of the wastewater being treated. Thus, as will be understood, the controller 302 may coordinate the position of the venturi plate 163 with the operation of the flare cap 134, the position of the ambient air or bleed valve 306, and the speed of the induction fan 190 to maximize wastewater concentration (turbulent mixing) without fully drying the wastewater so as to prevent formation of dry particulates. The controller 302 may use pressure inputs from the pressure sensors to position the venturi plate 163. Of course, the venturi plate 163 may be manually controlled or automatically controlled.

The controller 302 may also be connected to a motor 312 which controls the operation of the damper 198 in the gas re-circulating circuit of the fluid scrubber 122. The controller 302 may cause the motor 312 or other type of actuator to move the damper 198 from a closed position to an open or to a partially open position based on, for example, signals from pressure sensors 313, 315 disposed at the gas entrance and the gas exit of the fluid scrubber 122. The controller 302 may control the damper 198 to force gas from the high pressure side of the exhaust section 124 (downstream of the induced draft fan 190) into the fluid scrubber entrance to maintain a predetermined minimum pressure difference between the two pressure sensors 313. 315. Maintaining this minimum pressure difference assures proper operation of the fluid scrubber 122. Of course, the damper 198 may be manually controlled instead or in addition to being electrically controlled.

Thus, as will be understood from the above discussion, the controller 302 may implement one or more on/off control loops used to start up or shut down the concentrator 110 without affecting the operation of the flare 130. For example, the controller 302 may implement a flare cap control loop which opens or closes the flare cap 134, a bleed valve control loop which opens or begins to close the ambient air valve 306, and an induced draft fan control loop which starts or stops the induced draft fan 190 based on whether the concentrator 110 is being started or stopped. Moreover, during operation, the controller 302 may implement one or more on-line control loops which may control various elements of the concentrator 110 individually or in conjunction with one another to provide for better or optimal concentration. When implementing these on-line control loops, the controller 302 may control the speed of induced draft fan 190, the position or angle of the venturi plate 163, the position of the flare cap 134 and or the position of the ambient air valve 306 to control the fluid flow through the concentrator 110, and/or the temperature of the air at the inlet of the concentrator assembly 120 based on signals from the temperature and pressure sensors. Moreover, the controller 302 may maintain the performance of the concentration process at steady-state conditions by controlling the pumps 184 and 182 which pump new and re-circulating fluid to be concentrated into the concentrator assembly 120. Still further, the controller 302 may implement a pressure control loop to control the position of the damper 198 to assure proper operation of the fluid scrubber 122. Of course, while the controller 302 is illustrated in FIG. 9 as a single controller device that implements these various control loops, the controller 302 could be implemented as multiple different control devices by, for example, using multiple different PLCs.

As will be understood, the concentrator 110 described herein directly utilizes hot waste gases in processes after the gases have been thoroughly treated to meet emission standards, and so seamlessly separates the operational requirements of the process that generates the waste heat from the process which utilizes the waste heat in a simple, reliable and effective manner.

In addition to being an important component of the concentrator 110 during operation of the concentrator 110, the automated or manually actuated flare cap 134 described herein can be used in a standalone situation to provide weather protection to a flare or to a flare and a concentrator combination when the flare stands idle. With the flare cap 134 closed, the interior of the metal shell of the flare 130 along with the refractory, burners and other critical components of the flare assembly 115 and the heat transfer assembly 117 are protected from corrosion and general deterioration related to exposure to the elements. In this case, the controller 302 may operate the flare cap motor 135 to keep the flare cap 134 fully open or partially closed during idling of the flare 130. Moreover, beyond using a flare cap 134 that closes automatically when the flare 130 shuts down or that opens automatically when the flare 130 is ignited, a small burner, such as the normal pilot light, may be installed inside of the flare 130 and may be run when the flare 130 is shut down but while the flare cap 134 held closed. This small burner adds further protection against deterioration of flare components caused by dampness, as it will keep the interior of the flare 130 dry. An example of a stand alone flare that may use the flare cap 134 described herein in a stand-alone situation is a stand-by flare installed at a landfill to ensure gas control when a landfill gas fueled power plant is off-line.

Figure 10:
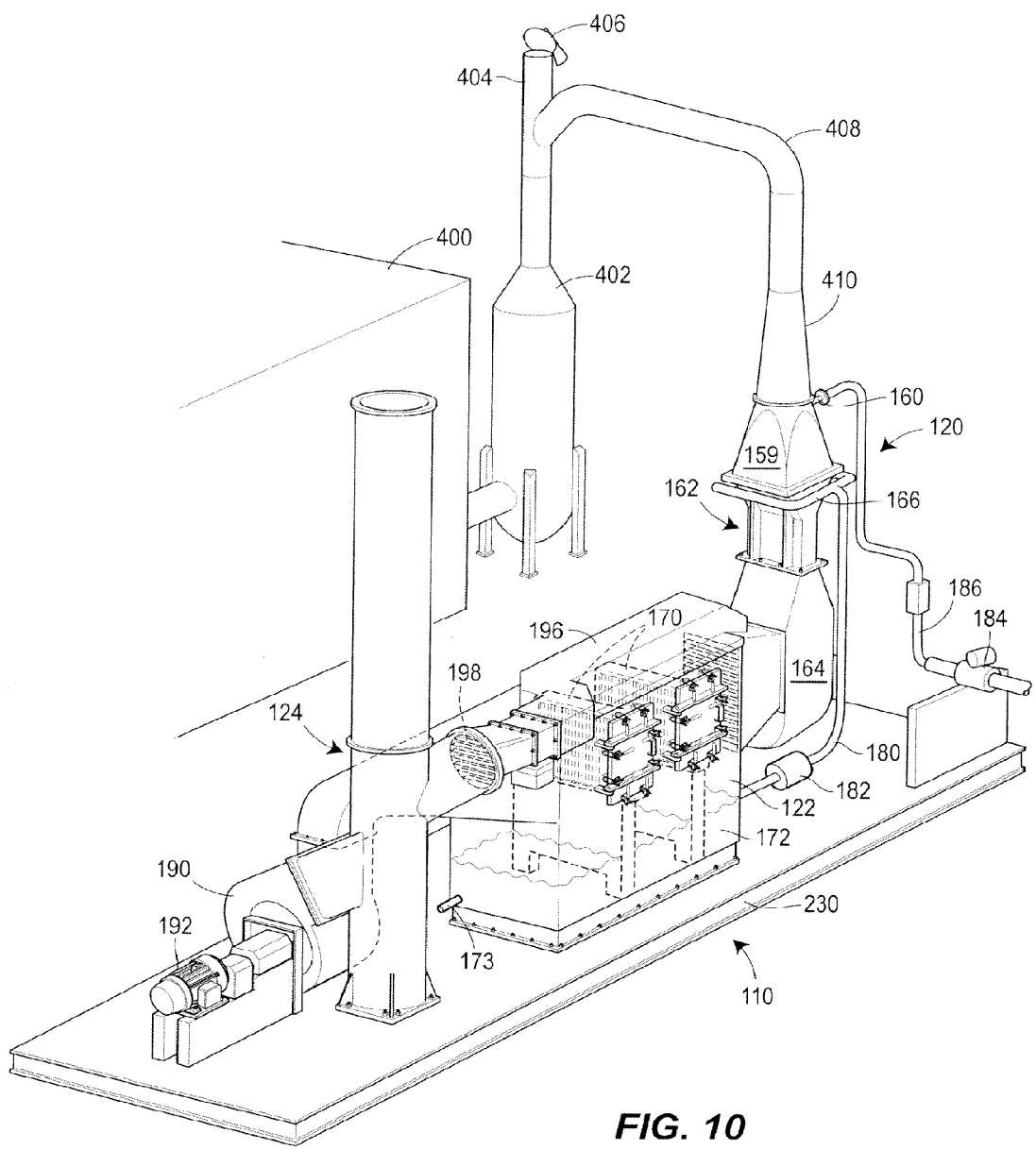
FIG. 10 is a diagram of the compact liquid concentrator of FIG. 3 attached to a combustion engine stack as a source of waste heat.

While the liquid concentrator 110 has been described above as being connected to a landfill flare to use the waste heat generated in the landfill flare, the liquid concentrator 110 can be easily connected to other sources of waste heat. For example, FIG. 10 illustrates the concentrator 110 modified so as to be connected to an exhaust stack of a combustion engine plant 400 and to use the waste heat from the engine exhaust to perform liquid concentration. While, in one embodiment, the engine within the plant 400 may operate on landfill gas to produce electricity, the concentrator 110 can be connected to run with exhaust from other types of engines, including other types of combustion engines, such as those that operate on gasoline, diesel fuel, etc.

Referring to FIG. 10, exhaust generated in an engine (not shown) within the plant 400 is provided to a muffler 402 on the exterior of the plant 400 and, from there, enters into a combustion gas exhaust stack 404 having a combustion gas exhaust stack cap 406 disposed on the top thereof. The cap 406 is essentially counter-weighted to close over the exhaust stack 404 when no exhaust is exiting the stack 404, but is easily pushed up by the pressure of the exhaust when exhaust is leaving the stack 404. In this case, a Y-connector is provided within the exhaust stack 404 and operates to connect the stack 404 to a transfer pipe 408 which transfers exhaust gas (a source of waste heat) from the engine to an expander section 410. The expander section 410 mates with the quencher 159 of the concentrator 110 and provides the exhaust gas from the engine directly to the concentrator assembly 120 of the concentrator 110. It is typically not necessary to include an air bleed valve upstream of the concentrator section 120 when using engine exhaust as a source of waste heat because exhaust gas typically leaves an engine at less than 900 degrees Fahrenheit, and so does not need to be cooled significantly before entering the quencher 159. The remaining parts of the concentrator 110 remain the same as described above with respect to FIGS. 3-8. As a result, it can be seen that the liquid concentrator 110 can be easily adapted to use various different sources of waste heat without a lot of modification.

Generally, when controlling the liquid concentrator 110 of FIG. 10, the controller will turn on the induced draft fan 190 while the engine in the plant 400 is running. The controller will increase the speed of the induced draft fan 190 from a minimal speed until the point that most or all of the exhaust within the stack 404 enters the transfer pipe 408 instead of going out of the top of the exhaust stack 404. It is easy to detect this point of operation, which is reached when, as the speed of the induced draft fan 190 is increased, the cap 406 first sits back down on the top of the stack 404. It may be important to prevent increasing the speed of the induced draft fan 190 above this operational point, so as to not create any more of a negative pressure within the concentrator 110 than is necessary, and thereby assuring that the operation of the concentrator 110 does not change the back pressure and, in particular, create undesirable levels of suction experienced by the engine within the plant 400. Changing the back pressure or applying suction within the exhaust stack 404 may adversely effect the combustion operation of the engine, which is undesirable. In one embodiment, a controller (not shown in FIG. 10), such as a PLC, may use a pressure transducer mounted in the stack 404 close to the location of the cap 406 to continuously monitor the pressure at this location. The controller can then send a signal to the variable frequency drive on the induced draft fan 190 to control the speed of the induced draft fan 190 to maintain the pressure at a desirable set point, so as to assure that undesirable back pressure or suction is not being applied on the engine.

Figure 11:
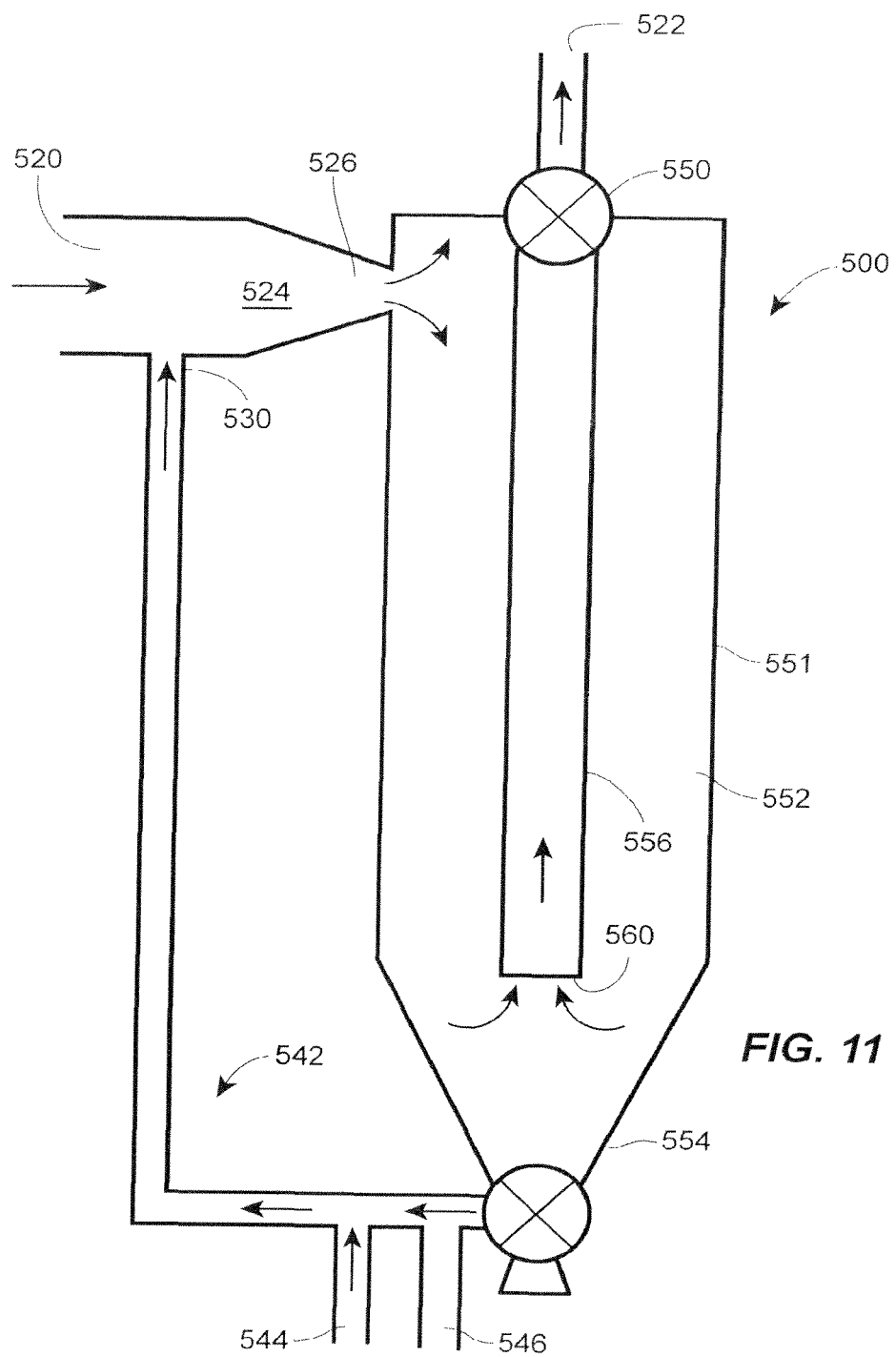
FIG. 11 is a general schematic diagram of a second embodiment of a compact liquid concentrator.
Figure 12:
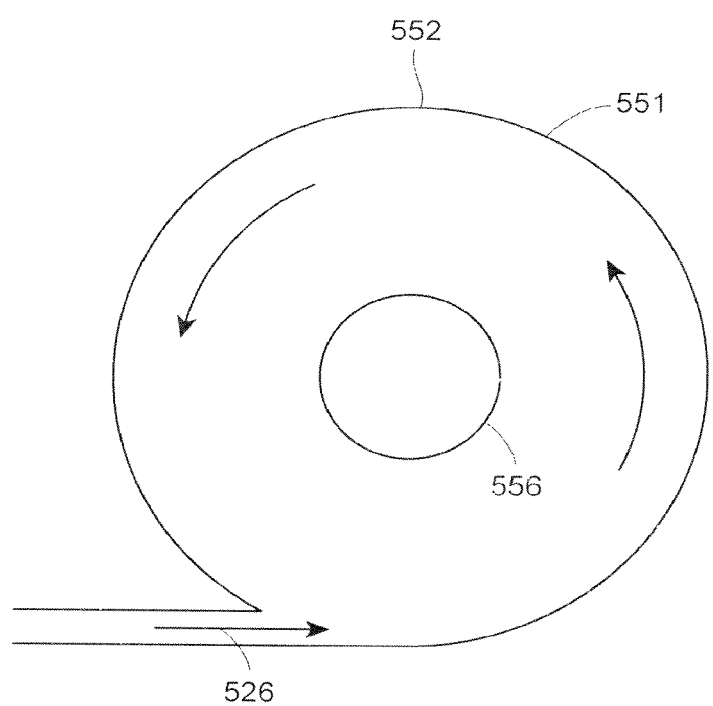
FIG. 12 is a top view of the compact liquid concentrator of FIG. 11.

FIGS. 11 and 12 illustrate a side cross-sectional view, and a top cross-sectional view, of another embodiment of a liquid concentrator 500. The concentrator 500 is shown in a generally vertical orientation. However, the concentrator 500 shown in FIG. 11 may be arranged in a generally horizontal orientation or a generally vertical orientation depending on the particular constraints of a particular application. For example, a truck mounted version of the concentrator may be arranged in a generally horizontal orientation to allow the truck-mounted concentrator to pass under bridges and overpasses during transport from one site to another. The liquid concentrator 500 has a gas inlet 520 and a gas exit 522. A flow corridor 524 connects the gas inlet 520 to the gas exit 522. The flow corridor 524 has a narrowed portion 526 that accelerates the gas through the flow corridor 524. A liquid inlet 530 injects a liquid into the gas stream prior to the narrowed portion 526. In contrast to the embodiment of FIG. 1, the narrowed portion 526 of the embodiment of FIG. 11 directs the gas-liquid mixture into a cyclonic chamber 551. The cyclonic chamber 551 enhances the mixing of the gas and liquid while also performing the function of the demister in FIG. 1. The gas-liquid mixture enters the cyclonic chamber 551 tangentially (see FIG. 12) and then moves in a cyclonic manner through the cyclonic chamber 551 towards a liquid outlet area 554. The cyclonic circulation is facilitated by a hollow cylinder 556 disposed in the cyclonic chamber 551 that conducts the gas to the gas outlet 522. The hollow cylinder 556 presents a physical barrier and maintains the cyclonic circulation throughout the cyclonic chamber 551 including the liquid outlet area 554.

As the gas-liquid mixture passes through the narrowed portion 526 of the flow corridor 524 and circulates in the cyclonic chamber 551, a portion of the liquid evaporates and is absorbed by the gas. Furthermore, centrifugal force accelerates movement of entrained liquid droplets in the gas towards the side wall 552 of the cyclonic chamber 551 where the entrained liquid droplets coalesce into a film on the side wall 552. Simultaneously, centripetal forces created by an induction fan 550 collect the demisted gas flow at the inlet 560 of the cylinder 556 and direct the flow to the gas outlet 522. Thus, the cyclonic chamber 551 functions both as a mixing chamber and a demisting chamber. As the liquid film flows towards the liquid outlet area 554 of the chamber due to the combined effects of the force of gravity and the cyclonic motion within cyclonic chamber 551 toward the liquid outlet area 554, the continuous circulation of the gas in the cyclonic chamber 551 further evaporates a portion of the liquid film. As the liquid film reaches the liquid outlet area 554 of the cyclonic chamber 551, the liquid is directed through a re-circulating circuit 542. Thus, the liquid is re-circulated through the concentrator 500 until a desired level of concentration is reached. A portion of the concentrated slurry may be drawn off through an extraction port 546 when the slurry reaches the desired concentration (this is called blowdown). Fresh liquid is added to the circuit 542 through a fresh liquid inlet 544 at a rate equal to the rate of evaporation plus the rate of slurry drawn off through the extraction port 546.

As the gas circulates in the cyclonic chamber 551, the gas is cleansed of entrained liquid droplets and drawn towards the liquid discharge area 554 of the cyclonic chamber 551 by the induction fan 550 and towards an inlet 560 of the hollow cylinder 556. The cleansed gas then travels through the hollow cylinder 556 and finally vents through the gas exit 522 to the atmosphere or further treatment (e.g., oxidization in a flare).

Figure 13:
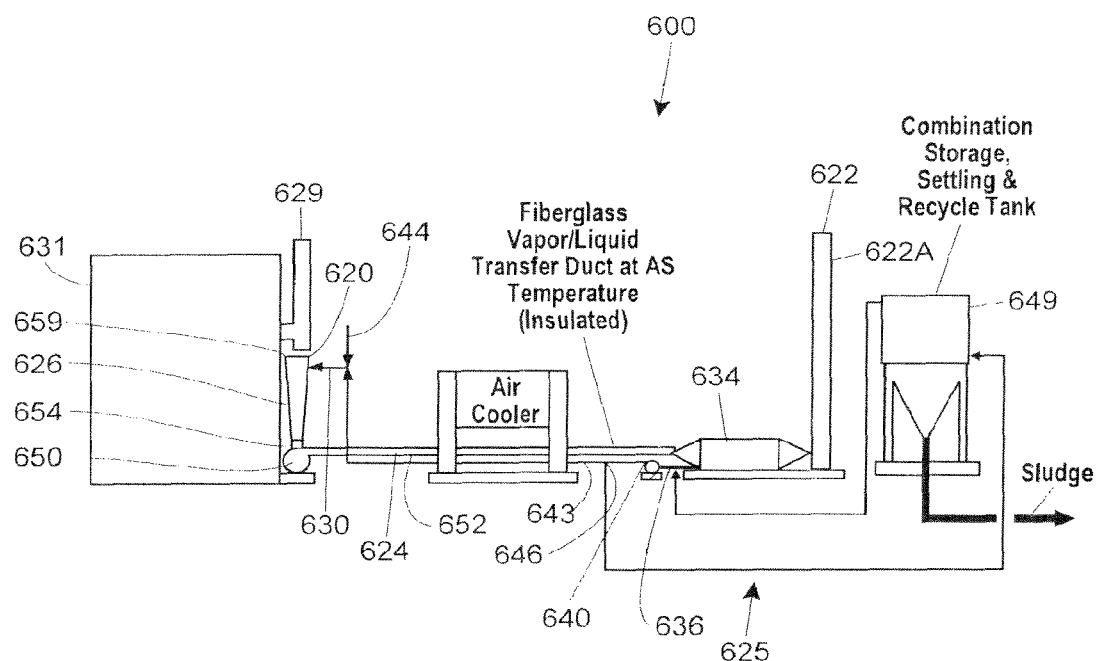
FIG. 13 is a schematic diagram of a third embodiment of a compact liquid concentrator, the third embodiment being a distributed liquid concentrator.

FIG. 13 illustrates a schematic view of a distributed liquid concentrator 600 configured in a manner that enables the concentrator 600 to be used with many types of sources of waste heat, even sources of waste heat that are located in places that are hard to access, such as on the sides of buildings, in the middle of various other equipment, away from roads or other access points, etc. While the liquid concentrator 600 will be described herein as being used to process or concentrate leachate, such as leachate collected from a landfill, the liquid concentrator 600 could be used to concentrate other types of liquids as well or instead including many other types of wastewaters.

Generally speaking, the liquid concentrator 600 includes a gas inlet 620, a gas outlet or a gas exit 622, a flow corridor 624 connecting the gas inlet 620 to the gas exit 622 and a liquid re-circulating system 625. A concentrator section has a flow corridor 624 that includes a quencher section 659 including the gas inlet 620 and a fluid inlet 630, a venturi section 626 disposed downstream of the quencher section 659, and a blower or draft fan 650 connected downstream of the venturi section 626. The fan 650 and a flooded elbow 654 couple a gas outlet of the concentrator section (e.g., an outlet of the venturi section 626) to a piping section 652. The flooded elbow 654, in this case, forms a 90 degree turn in the flow corridor 624. However, the flooded elbow 654 could form a turn that is less than or more than 90 degrees if desired. The piping section 652 is connected to a demister, in this case illustrated in the form of a crossflow scrubber 634, which is, in turn, connected to a stack 622A having the gas exit 622.

The re-circulating system 625 includes a sump 636 coupled to a liquid outlet of the crossflow scrubber 634, and a re-circulating or recycle pump 640 coupled between the sump 636 and a piping section 642 which delivers re-circulated fluid to the fluid inlet 630. A process fluid feed 644 also delivers leachate or other liquid to be processed (e.g., concentrated) to the fluid inlet 630 to be delivered to the quencher section 659. The re-circulating system 625 also includes a liquid takeoff 646 connected to the piping section 642, which delivers some of the recycled fluid (or concentrated fluid) to a storage, settling and recycle tank 649. The heavier or more concentrated portions of the liquid in the settling tank 649 settle to the bottom of the tank 649 as sludge, and are removed and transported for disposal in concentrated form. Less concentrated portions of the liquid in the tank 649 are delivered back to the sump 636 for reprocessing and further concentration, as well as to assure that an adequate supply of liquid is available at the liquid inlet 630 at all times so to ensure that dry particulate is not formed. Dry particulate can form at reduced ratios of process fluid to hot gas volumes.

In operation, the quencher section 659 mixes fluid delivered from the liquid inlet 630 with gas containing waste heat collected from, for example, an engine muffler and stack 629 associated with an internal combustion engine (not shown). The liquid from the fluid inlet 630 may be, for example, leachate to be processed or concentrated. As illustrated in FIG. 13, the quencher section 659 is connected vertically above the venturi portion 626 which has a narrowed portion that operates to accelerate the flow of gas and liquid through a section of the fluid flow corridor 624 immediately downstream of the venturi portion 626 and upstream of the fan 650. Of course, the fan 650 operates to create a low pressure region immediately downstream of the venturi portion 626, drawing gas from the stack 629 through the venturi portion 626 and the flooded elbow 654 and causing mixing of the gas and liquid.

As noted above, the quencher section 659 receives hot exhaust gas from the engine exhaust stack 629 and may be connected directly to any desired portion of the exhaust stack 629. In this illustrated embodiment, the engine exhaust stack 629 is mounted on an outside of a building 631 that houses one or more electric power generators that generate electric power using landfill gas as a combustion fuel. In this case, the quencher section 659 may be connected directly to a condensate take off (e.g., a weep leg) associated with the stack 629 (i.e., a lower portion of the exhaust stack 629). Here, the quencher section 659 may be mounted immediately below or adjacent to the stack 629 requiring only a few inches or at most a few feet of expensive, high temperature piping material to connect the two together. If desired, however, the quencher section 659 may be coupled any other portion of the exhaust stack 629, including, for example, to the top or to a middle portion of the stack 629 via appropriate elbows or takeoffs.

As noted above, the liquid inlet 630 injects a liquid to be evaporated (e.g., landfill leachate) into the flow corridor 624 through the quencher section 659. If desired, the liquid inlet 630 may include a replaceable nozzle for spraying the liquid into the quencher section 659. The liquid inlet 630, whether or not equipped with a nozzle, may introduce the liquid in any direction, from perpendicular to parallel to the gas flow as the gas moves through the flow corridor 624. Moreover, as the gas (and the waste heat stored therein) and liquid flow through the venturi portion 626, the venturi principle creates an accelerated and turbulent flow that thoroughly mixes the gas and liquid in the flow corridor 624 immediately downstream of the venturi section 626. As a result of the turbulent mixing, a portion of the liquid rapidly vaporizes and becomes part of the gas stream. This vaporization consumes a large amount of the heat energy within the waste heat as latent heat that exits the concentrator system 600 as water vapor within the exhaust gas.

After leaving the narrowed portion of the venturi section 626, the gas/liquid mixture passes through the flooded elbow 654 where the flow corridor 624 turns 90 degrees to change from a vertical flow to a horizontal flow. The gas/liquid mixture flows past the fan 650 and enters a high pressure region at the downstream side of the fan 650, this high pressure region existing in the piping section 652. The use of a flooded elbow 654 at this point in the system is desirable for at least two reasons. First, the liquid at the bottom portion of the flooded elbow 654 reduces erosion at the turning point in the flow corridor 624, which erosion would normally occur due to suspended particles within the gas/liquid mixture flowing at high rates of speed through a 90 degree turn and impinging at steep angles directly on the bottom surfaces of a conventional elbow were the flooded elbow 654 not employed. The liquid in the bottom of the flooded elbow 654 absorbs the energy in these particles and therefore prevents erosion on the bottom surface of the flooded elbow 654. Still further, liquid droplets which still exist in the gas/liquid mixture as this mixture arrives at the flooded elbow 654 are more easily collected and removed from the flow stream if they impinge upon a liquid. That is, the liquid at the bottom of the flooded elbow 654 operates to collect liquid droplets impinging thereon because the liquid droplets within the flow stream are more easily retained when these suspended liquid droplets come into contact with a liquid. Thus, the flooded elbow 654, which may have a liquid takeoff (not shown) connected to, for example, the re-circulating circuit 625, operates to remove some of the process fluid droplets and condensation from the gas/liquid mixture exiting the venturi section 626.

Importantly, the gas/liquid mixture while passing through the venturi section 626 quickly approaches the adiabatic saturation point, which is at a temperature that is much lower than that of the gas exiting the stack 629. For example, while the gas exiting the stack 629 may be between about 900 and about 1800 degrees Fahrenheit, the gas/liquid mixture in all sections of the concentrator system 600 downstream of the venturi section 626 will generally be in the range of 150 degrees to 190 degrees Fahrenheit, although it can range higher or lower than these values based on the operating parameters of the system. As a result, sections of the concentrator system 600 downstream of the venturi section 626 do not need to be made of high temperature resistant materials and do not need to be insulated at all or to the degree that would be necessary for transporting higher temperature gases if insulation were to be applied for the purpose of more fully utilizing the waste heat content of the inlet hot gas. Still further the sections of the concentrator system 600 downstream of the venturi section 626 disposed in areas, such as along the ground that people will come into contact with, without significant danger, or with only minimal exterior protection. In particular, the sections of the concentrator system downstream of the venturi section 626 may be made of fiberglass and may need minimal or no insulation. Importantly, the gas/liquid stream may flow within the sections of the concentrator system downstream of the venturi section 626 over a relatively long distance while maintaining the gas/liquid mixture therein at close to the adiabatic saturation point, thereby allowing the piping section 652 to easily transport the flow stream away from the building 631 to a more easily accessible location, at which the other equipment associated with the concentrator 600 can be conveniently disposed. In particular, the piping section 652 may span 20 feet, 40 feet, or even longer while maintaining the flow therein at close to the adiabatic saturation point. Of course, these lengths may be longer or shorter based on ambient temperature, the type of piping and insulation used, etc. Moreover, because the piping section 652 is disposed on the high pressure side of the fan 650, it is easier to remove condensation from this stream. In the example embodiment of FIG. 13, the piping section 652 is illustrated as flowing past or beneath an air cooler associated with the engines within the building 631. However, the air cooler of FIG. 13 is merely one example of the types of obstructions that may be located close to the building 631 which make it problematic to place all of the components of the concentrator 600 in close proximity to the source of the waste heat (in this case, the stack 629). Other obstructions could include other equipment, vegetation such as trees, other buildings, inaccessible terrain without roads or easy access points, etc.

In any event, the piping section 652 delivers the gas/liquid stream at close to the adiabatic saturation point to the demister 634, which may be, for example, a crossflow scrubber. The demister 634 operates to remove entrained liquid droplets from the gas/liquid stream. The removed liquid collects in the sump 636 which directs the liquid to the pump 640. The pump 640 moves the liquid through the return line 642 of the re-circulating circuit 625 back to the liquid inlet 630. In this manner, the captured liquid may be further reduced through evaporation to a desired concentration and/or re-circulated to prevent the formation of dry particulate. Fresh liquid to be concentrated is input through the fresh liquid inlet 644. The rate of fresh liquid input into the re-circulating circuit 625 should be equal to the rate of evaporation of the liquid as the gas-liquid mixture flows through the flow corridor 624 plus the rate of liquid or sludge extracted from the settling tank 649 (assuming the material within the settling tank 649 remains at a constant level). In particular, a portion of the liquid may be drawn off through an extraction port 646 when the liquid in the re-circulating circuit 625 reaches a desired concentration. The portion of liquid drawn off through the extraction port 646 may be sent to the storage and settling tank 649 where the concentrated liquid is allowed to settle and separate into its component parts (e.g., a liquid portion and a semi-solid portion). The semi-solid portion may be drawn from the tank 649 and disposed of or further treated.

As noted above, the fan 650 draws the gas through a portion of the flow corridor 624 under negative pressure and pushes gas through another portion of the flow corridor 624 under positive pressure. The quencher section 659, venturi section 626, and fan 650 may be attached to the building 631 with any type of connecting device and, as illustrated in FIG. 13, are disposed in close proximity to the source of waste heat. However the demister 634 and the gas outlet 622, as well as the settling tank 649, may be located some distance away from the quencher section 659, venturi section 626, and fan 650, at for example, an easy to access location. In one embodiment, the demister 634 and the gas outlet 622 and even the settling tank 649 may be mounted on a mobile platform such as a pallet or a trailer bed.

Figure 14:
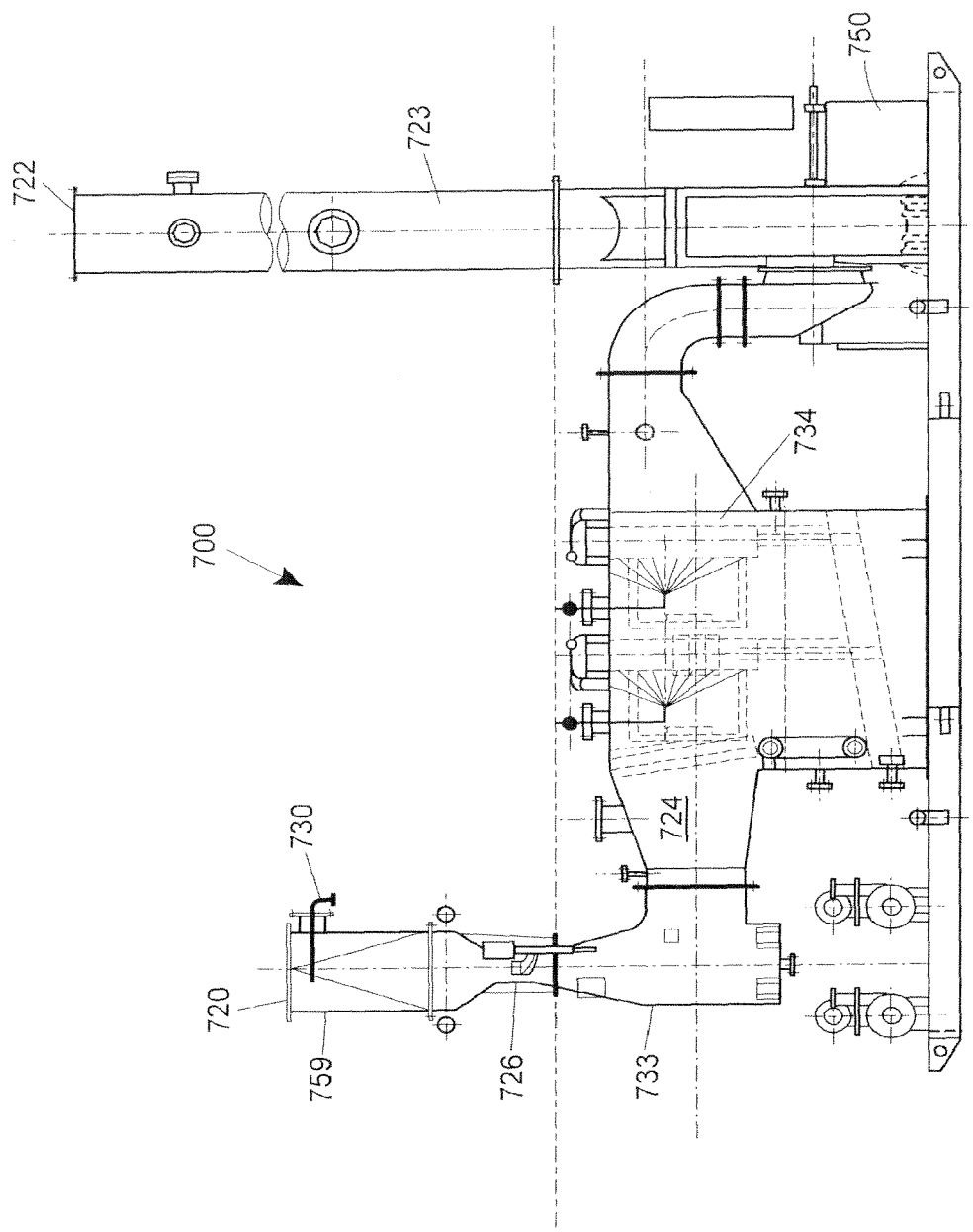
FIG. 14 is a side elevational cross-section of the liquid concentrating portion of the distributed liquid concentrator of FIG. 13.
Figure 15:
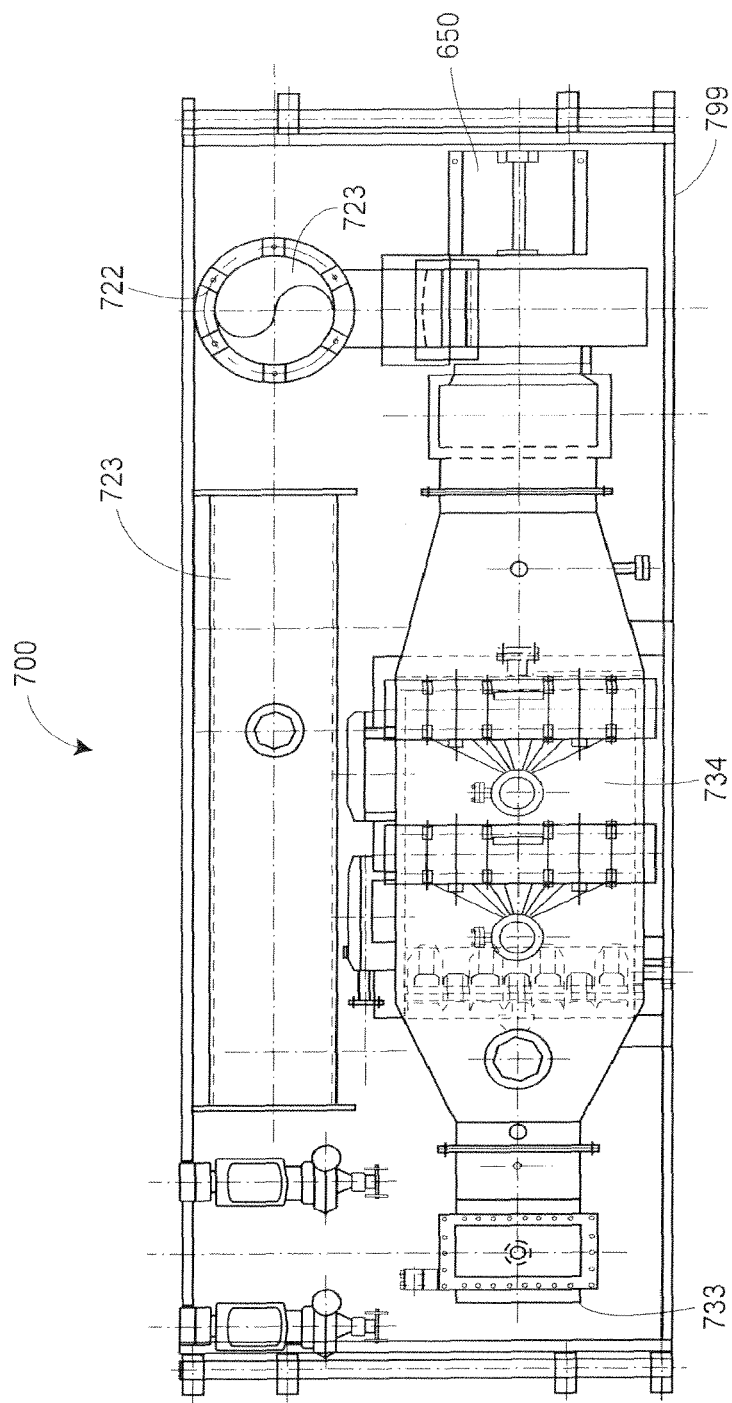
FIG. 15 is a top plan view of the liquid concentrating section of FIG. 14.
Figure 16:
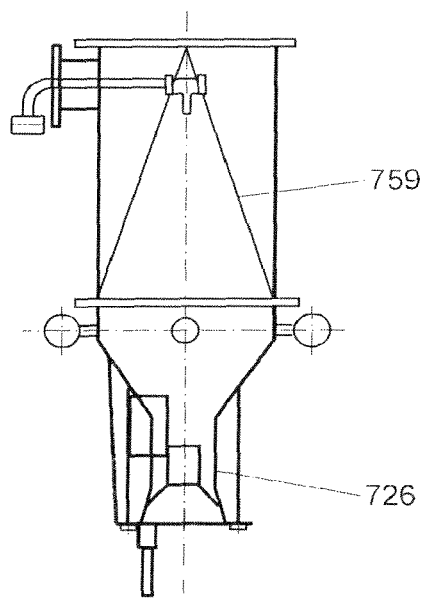
FIG. 16 is a close up side view of a quencher and venturi section of the distributed liquid concentrator of FIG. 13.

FIGS. 14-16 illustrate another embodiment of a liquid concentrator 700 which may be mounted on a pallet or trailer bed. In one embodiment, some of the components of the concentrator 700 may remain on the bed and be used to perform concentration activities, while others of these components may be removed and installed near a source of waste heat in the manner illustrated in, for example, the embodiment of FIG. 13. The liquid concentrator 700 has a gas inlet 720 and a gas exit 722. A flow corridor 724 connects the gas inlet 720 to the gas exit 722. The flow corridor 724 has a narrowed or venturi portion 726 that accelerates the gas through the flow corridor 724. Gas is drawn into a quencher section 759 by an induction fan (not shown). A liquid inlet 730 injects a liquid into the gas stream in the quencher section 759. Gas is directed from the venturi section 726 into the demister (or crossflow scrubber) 734 by an elbow section 733. After exiting the demister 734, the gas is directed to the gas exit 722 through a stack 723. Of course, as described above, some of these components may be removed from the bed and installed in close proximity to a source of waste heat while others of these components (such as the demister 734, the stack 723 and the gas exit 722) may remain on the bed.

As the gas-liquid mixture passes through the venturi portion 726 of the flow corridor 724, a portion of the liquid evaporates and is absorbed by the gas, thus consuming a large portion of heat energy within the waste heat as latent heat that exits the concentrator system 700 as water vapor within the exhaust gas.

In the embodiment shown in FIGS. 14-16, portions of the liquid concentrator 700 may be disassembled and mounted on a pallet or trailer skid for transportation. For example, the quenching section 759 and the venturi section 726 may be removed from the elbow section 733, as illustrated by the dashed line in FIG. 14. Likewise, the stack 723 may be removed from the induction fan 750 as illustrated by the dashed line in FIG. 14. The elbow section 733, demister 734, and induction fan 750 may be secured on a pallet or trailer skid 799 as a unit. The stack 723 may be secured separately to the pallet or trailer skid 799. The quenching section 759 and venturi section 726 may also be secured to the pallet or trailer skid 799, or alternately transported separately. The compartmentalized construction of the liquid concentrator 700 simplifies transportation of the liquid concentrator 700.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A combustion gas exhaust cap assembly for a combustion gas exhaust stack, the combustion gas exhaust cap assembly comprising:
an adapter section for mounting to the combustion gas exhaust stack, the adapter section having a primary combustion gas outlet that allows combustion gases from the combustion gas exhaust pipe to vent to the atmosphere and a secondary combustion gas outlet, the secondary combustion gas outlet directing combustion gas into a secondary process; and
a combustion gas exhaust cap mounted on the adapter section proximate the primary combustion gas outlet, the combustion gas exhaust cap being movable between an open position in which the combustion gas exhaust cap allows combustion gas to vent from the combustion gas exhaust pipe vent through the primary combustion gas outlet and a closed position in which the combustion gas exhaust cap covers the primary combustion gas outlet to seal off the primary combustion gas outlet, which diverts combustion gas from the combustion gas exhaust pipe through the secondary combustion gas outlet.

2. The combustion gas exhaust cap of claim 1, further comprising a transfer pipe connected to the secondary combustion gas outlet, the transfer pipe forming a portion of a fluid passageway between the adapter section and the secondary process.

3. The combustion gas exhaust cap assembly of claim 1, further comprising a cap actuator mounted on the adapter section and operatively connected to the combustion gas exhaust cap, the cap actuator actuating to move the combustion gas exhaust cap between the open position and the closed position.

4. The combustion gas exhaust cap assembly of claim 3, further comprising a controller operatively connected the cap actuator, the controller operable to move the combustion gas exhaust cap between the open position and the closed position.

5. The combustion gas exhaust cap assembly of claim 4, further comprising a temperature sensor, operable to generate a temperature signal, and wherein the controller is communicatively connected to the temperature sensor, the controller operable to actuate the combustion gas exhaust cap actuator based on the temperature signal.

6. The combustion gas exhaust cap assembly of claim 5, further comprising an ambient air valve, the ambient air valve forming a fluid passageway between the transfer pipe and the atmosphere, and wherein the controller is operatively connected to the ambient air valve and positions the ambient air valve based on the temperature signal.

7. The combustion gas exhaust cap assembly of claim 3, wherein the cap actuator is a motor.

8. The combustion gas exhaust cap assembly of claim 7, wherein the motor is one of an electric motor, a pneumatic motor, and a hydraulic motor.

9. The combustion gas exhaust cap assembly of claim 3, wherein the cap actuator comprises a chain drive connected to the combustion gas exhaust cap.

10. The combustion gas exhaust cap assembly of claim 1, further comprising a counter weight mounted on a side of a pivot point that is opposite the combustion gas exhaust cap, the counter weight being sized to offset at least a portion of a weight of the combustion gas exhaust cap about the pivot point.

11. The combustion gas exhaust cap assembly of claim 1, wherein the combustion gas exhaust cap is made of a high temperature resistant material.

12. The combustion gas exhaust cap assembly of claim 11, wherein the high temperature resistant material is one of stainless steel and carbon steel.

13. The combustion gas exhaust cap assembly of claim 11 wherein the combustion gas exhaust cap is refractory lined with one of aluminum oxide and zirconium oxide.

14. The combustion gas exhaust cap assembly of claim 1, further comprising a biasing element mounted to the combustion gas exhaust cap and the adapter section proximate a pivot point of the combustion gas exhaust cap, the biasing element biasing the combustion gas exhaust cap to the open position.

15. The combustion gas exhaust cap assembly of claim 14, wherein the biasing element is a spring.

16. The combustion gas exhaust cap assembly of claim 14, wherein the biasing element is a counterweight.

17. A wastewater concentrating assembly having an exhaust stack cap, the wastewater concentrating assembly comprising:
- an exhaust stack having an open end forming a primary exhaust gas exit;
- a wastewater concentrator;
- a transfer pipe, the transfer pipe fluidly connected between the exhaust stack and the wastewater concentrator, the transfer pipe forming a secondary exhaust gas exit in the exhaust stack; and
- an exhaust stack cap mounted approximate to the open end of the exhaust stack, the exhaust stack cap movable between an open position in which the exhaust stack cap allows exhaust gas to exit the primary exhaust gas exit and a closed position in which the exhaust stack cap covers the primary exhaust gas exit to seal off the primary exhaust gas exit, which diverts exhaust gas through the secondary exhaust gas exit.

18. A landfill gas flare cap assembly comprising:
- a landfill gas flare connected to a source of landfill gas, the landfill gas flare having an open top end forming a combustion gas exit; and
- a flare cap attached to the landfill gas flare proximate the open top end, the flare cap movable between an open position, which leaves the open top end of the landfill gas flare uncovered, and a closed position, which covers the open top end of the landfill gas flare and seals off the open top end of the landfill gas flare.

19. The landfill gas flare cap assembly of claim 18, further comprising a motor operatively connected to the flare cap, the motor operable to position the flare cap in one of the open position and the closed position.

20. The landfill gas flare cap assembly of claim 19, further comprising a controller, the controller including a processor that executes control logic to position the flare cap in one of the open position and the closed position.

* * * * *